United States Patent
Yamashita

(10) Patent No.: US 9,581,240 B2
(45) Date of Patent: Feb. 28, 2017

(54) CONTROL APPARATUS OF AUTOMATIC TRANSMISSION AND AUTOMATIC TRANSMISSION OF VEHICLE

(71) Applicant: HONDA MOTOR CO., LTD., Tokyo (JP)

(72) Inventor: Hideaki Yamashita, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 41 days.

(21) Appl. No.: 14/712,913

(22) Filed: May 15, 2015

(65) Prior Publication Data
US 2015/0330504 A1 Nov. 19, 2015

(30) Foreign Application Priority Data

May 19, 2014 (JP) .................................. 2014-103523

(51) Int. Cl.
*F16H 61/12* (2010.01)
*F16H 61/688* (2006.01)
*F16H 3/00* (2006.01)
*F16H 3/093* (2006.01)

(52) U.S. Cl.
CPC ........... *F16H 61/688* (2013.01); *F16H 61/12* (2013.01); *F16H 3/006* (2013.01); *F16H 2003/0931* (2013.01); *F16H 2061/1224* (2013.01); *F16H 2061/1264* (2013.01); *F16H 2200/006* (2013.01)

(58) Field of Classification Search
CPC .................. F16H 61/12; F16H 61/688; F16H 2003/0931; F16H 2061/1224; F16H 2061/1264; F16H 2061/1288; F16H 2200/006; F16H 3/006
See application file for complete search history.

(56) References Cited

U.S. PATENT DOCUMENTS

| | | | | |
|---|---|---|---|---|
| 4,887,491 A | * | 12/1989 | Holbrook | ................ F16H 61/12 477/34 |
| 6,907,970 B2 | * | 6/2005 | Sugimura | ............... F16H 61/12 188/151 A |
| 7,494,442 B2 | * | 2/2009 | Futamura | ............ F16H 61/0206 477/158 |

(Continued)

FOREIGN PATENT DOCUMENTS

JP        3158935 B2     9/1996

*Primary Examiner* — Ramya Burgess
*Assistant Examiner* — David Morris
(74) *Attorney, Agent, or Firm* — Mori & Ward, LLP

(57) ABSTRACT

A control apparatus of an automatic transmission includes a first anomaly determination device and an energization interrupting device. The first anomaly determination device is configured to determine whether high-pressure anomaly has occurred in a first pressure regulating device. The high-pressure anomaly is to cause the first pressure regulating device to perform regulation to high pressure only. The energization interrupting device is configured to interrupt energization to a first switching device in a case where the first anomaly determination device determines that the high-pressure anomaly has occurred in the first pressure regulating device and in a state where a first switching valve is located at a first position connected to a first oil passage so as to supply hydraulic pressure of a hydraulic oil regulated by the first pressure regulating device to a second clutch.

7 Claims, 12 Drawing Sheets

(56) References Cited

U.S. PATENT DOCUMENTS

| | | | | |
|---|---|---|---|---|
| 7,975,566 B2* | 7/2011 | Moehlmann | ............ | F16H 61/12 74/335 |
| 8,042,418 B2* | 10/2011 | Matsushita | ............. | F16H 61/12 74/330 |
| 8,429,993 B2* | 4/2013 | Garabello | ............... | F16H 61/12 192/3.54 |
| 8,689,654 B2* | 4/2014 | Yagi | .................... | F16H 61/0021 74/330 |
| 8,752,444 B2* | 6/2014 | Garabello | ............... | F16H 61/12 192/3.54 |
| 2012/0304816 A1* | 12/2012 | Yagi | .................... | F16H 61/0021 74/665 B |

* cited by examiner

FIG. 4

| POWER SUPPLY | I | II | III |
|---|---|---|---|
| L/SolA | ○ | — | — |
| L/SolB | — | ○ | — |
| L/SolC | ○ | — | — |
| L/SolD | — | ○ | — |
| SolA | ○ | — | — |
| SolB | — | — | ○ |
| SolC | — | — | ○ |
| SolD | — | ○ | — |
| SolE | — | — | ○ |

FIG. 5

| DEVICE ROLE | L/SolA 1ST CLUTCH | L/SolB 2ND CLUTCH | L/SolC 1ST, 3RD, 6TH, 8TH SYNCHRO | L/SolD 2ND, 4TH, 5TH, 7TH SYNCHRO | SolA 1ST CLUTCH OR 6TH-8TH SYNCHRO | SolB 2ND CLUTCH OR 5TH SPEED SYNCHRO | SolC 8TH-6TH, 2ND-4TH OR 1ST-3RD, 5TH-7TH | SolD 1ST, 8TH OR 3RD, 6TH | SolE 2ND, 7TH OR 4TH, 5TH |
|---|---|---|---|---|---|---|---|---|---|
| POWER SUPPLY | I | II | I | II | I | III | III | II | III |
| OPERATIONS | BASICALLY SUPPLYING HYDRAULIC PRESSURE TO 1ST CLUTCH. UNDER OPERATION OF SolA, CONNECTED TO 5TH SPEED SYNCHRO. | BASICALLY SUPPLYING HYDRAULIC PRESSURE TO 2ND CLUTCH. UNDER OPERATION OF SolB, CONNECTED TO 6TH-8TH SYNCHRO. | AT NORMAL TIMES, SUPPLYING HYDRAULIC PRESSURE TO 1ST, 3RD, 6TH, 8TH GEAR STAGE. | AT NORMAL TIMES, SUPPLYING HYDRAULIC PRESSURE TO 2ND, 4TH, 5TH, 7TH GEAR STAGE. | NORMALLY CLOSED. OFF AT NORMAL TIMES, CONNECTING L/SolA HYDRAULIC PRESSURE TO 1ST CLUTCH. WHEN ON, SUPPLYING L/SolB HYDRAULIC PRESSURE TO 5TH SPEED SYNCHRO. | NORMALLY CLOSED. OFF AT NORMAL TIMES, CONNECTING L/SolB HYDRAULIC PRESSURE TO 2ND CLUTCH. WHEN ON, SUPPLYING L/SolA HYDRAULIC PRESSURE TO 6TH-8TH SPEED SYNCHRO. | NORMALLY CLOSED. OFF AT NORMAL TIMES, SUPPLYING L/SolC HYDRAULIC PRESSURE TO 8TH-6TH AND SUPPLYING L/SolD HYDRAULIC PRESSURE TO 2ND-4TH. WHEN ON, SUPPLYING L/SolC HYDRAULIC PRESSURE TO 1ST-3RD AND SUPPLYING L/SolD HYDRAULIC PRESSURE TO 5TH-7TH. | NORMALLY CLOSED. OFF AT NORMAL TIMES, SUPPLY FROM L/SolC TO 1ST SPEED AND SUPPLY FROM L/SolC TO 8TH SPEED. WHEN ON, SUPPLY FROM L/SolC TO 3RD SPEED AND SUPPLY FROM L/SolC TO 6TH SPEED. | NORMALLY CLOSED. OFF AT NORMAL TIMES, SUPPLY FROM L/SolD TO 7TH SPEED AND SUPPLY FROM L/SolD TO 2ND SPEED. WHEN ON, SUPPLY FROM L/SolD TO 5TH SPEED AND SUPPLY FROM L/SolD TO 4TH SPEED. |
| 1ST SPEED SHIFT | | | ○ | IRRELEVANT | ↓ | ↓ | ON | OFF | IRRELEVANT |
| 2ND SPEED SHIFT | | | IRRELEVANT | ○ | IRRELEVANT | ↓ | OFF | IRRELEVANT | OFF |
| 3RD SPEED SHIFT | | | ○ | IRRELEVANT | ↓ | ↓ | ON | ON | IRRELEVANT |
| 4TH SPEED SHIFT | | | IRRELEVANT | ○ | IRRELEVANT | ↓ | OFF | IRRELEVANT | ON |
| 5TH SPEED SHIFT | | | IRRELEVANT | ○ | IRRELEVANT | ↓ | ON | ON | ON |
| 6TH SPEED SHIFT | | | ○ | IRRELEVANT | ↓ | ↓ | OFF | IRRELEVANT | IRRELEVANT |
| 7TH SPEED SHIFT | | | IRRELEVANT | ○ | IRRELEVANT | ↓ | ON | IRRELEVANT | OFF |
| 8TH SPEED SHIFT | | | ○ | IRRELEVANT | ↓ | ↓ | OFF | OFF | IRRELEVANT |

CONTROL APPARATUS OF AUTOMATIC TRANSMISSION AND AUTOMATIC TRANSMISSION OF VEHICLE

CROSS-REFERENCE TO RELATED APPLICATIONS

The present application claims priority under 35 U.S.C. §119 to Japanese Patent Application No. 2014-103523, filed May 19, 2014, entitled "CONTROL APPARATUS OF AUTOMATIC TRANSMISSION." The contents of this application are incorporated herein by reference in their entirety.

BACKGROUND

1. Field

The present application relates to a control apparatus of an automatic transmission and an automatic transmission of a vehicle.

2. Description of the Related Art

As for detection of anomaly in an automatic transmission, the techniques described in Japanese Patent No. 3158935 are known. According to the techniques, since in a large vehicle, such as a bus, a distance from a shift lever arranged at a driver's seat to a transmission arranged in the rear of the vehicle is long, a gear shifting apparatus that operates with air pressure based on a detected value of a sensor arranged near the shift lever is provided while two systems of solenoid valve groups, which are a primary solenoid valve group and a secondary solenoid valve group, are provided in a hydraulic pressure supply circuit and when anomaly is detected in one of the solenoid valve groups, switch to the other solenoid valve group is performed for backup to identify the portion where the anomaly is occurring.

SUMMARY

According to one aspect of the present invention, a control apparatus of an automatic transmission includes a first input shaft, a second input shaft, at least one output shaft, a plurality of first speed-change gear groups, a plurality of second speed-change gear groups, a first transfer route, a second transfer route, an oil pump, a first pressure regulating unit, a first switching valve, a first switching unit, an anomaly determination unit, and an energization interrupting unit. The first input shaft and the second input shaft input rotation of a prime motor installed in a vehicle via a first clutch and a second clutch. The at least one output shaft is arranged in parallel to the first input shaft and the second input shaft. The plurality of first speed-change gear groups are arranged between the first input shaft and the output shaft, and when engaged with the first input shaft and the output shaft by a first gear engaging mechanism, are capable of changing speed of rotation of the first input shaft input via the first clutch and transferring the rotation to the output shaft. The plurality of second speed-change gear groups are arranged between the second input shaft and the output shaft and when engaged with the second input shaft and the output shaft by a second gear engaging mechanism, are capable of changing speed of rotation of the second input shaft input via the second clutch and transferring the rotation to the output shaft. The first transfer route is made up of the first clutch, the first input shaft, the first gear engaging mechanism, and the first speed-change gear group. The second transfer route is made up of the second clutch, the second input shaft, the second gear engaging mechanism, and the second speed-change gear group. The oil pump is connected to the prime motor. The first pressure regulating unit is arranged in an oil passage connected to an outlet of the oil pump and is capable of regulating hydraulic pressure of a hydraulic oil discharged from the oil pump. The first switching valve is arranged downstream of the first pressure regulating unit in the oil passage, is capable of switching supply of the hydraulic pressure of the hydraulic oil regulated by the first pressure regulating unit among a plurality of oil passages, when being at a position connected to one of the plurality of oil passages, supplies the hydraulic pressure of the hydraulic oil to the second clutch, when being at a position connected to another one of the plurality of oil passages, supplies the hydraulic pressure of the hydraulic oil to the second gear engaging mechanism in the second transfer route and causes any one of speed-change gears of the second speed-change gear group including a speed-change gear with a minimum transmission ratio to engage with the second input shaft and the output shaft. The first switching unit when energized, switches the first switching valve from the position connected to the one of the plurality of oil passages to the position connected to the another one of the plurality of oil passages. The anomaly determination unit determines whether high-pressure anomaly has occurred in the first pressure regulating unit. The high-pressure anomaly causes the first pressure regulating unit to perform regulation to high pressure only. The energization interrupting unit when the anomaly determination unit determines that the high-pressure anomaly has occurred in the first pressure regulating unit and when the first switching valve is at the position connected to the one of the plurality of oil passages and supplies the hydraulic pressure of the hydraulic oil to the second clutch, interrupts energization to the first switching unit.

According to another aspect of the present invention, an automatic transmission of a vehicle includes first and second input shafts, at least one output shaft, a first speed-change gear group, a second speed-change gear group, a first transfer route, a second transfer route, an oil pump, a first pressure regulating device, a first switching valve, a first switching device, a first anomaly determination device, and an energization interrupting device. The first and second input shafts are arranged in parallel to each other to transmit rotation of a prime motor installed in the vehicle via first and second clutches. The at least one output shaft is arranged in parallel to the first and second input shafts. The first speed-change gear group is arranged between the first input shaft and the at least one output shaft. The first speed-change gear group is to change speed of first rotation of the first input shaft transmitted via the first clutch so as to transmit the first rotation to the at least one output shaft in a state where the first speed-change gear group is engaged with the first input shaft and the at least one output shaft using a first gear engaging mechanism. The second speed-change gear group is arranged between the second input shaft and the at least one output shaft. The second speed-change gear group is to change speed of second rotation of the second input shaft transmitted via the second clutch so as to transmit the second rotation to the at least one output shaft in a state where the second speed-change gear group is engaged with the second input shaft and the at least one output shaft using a second gear engaging mechanism. The first transfer route includes the first clutch, the first input shaft, the first gear engaging mechanism, and the first speed-change gear group. The second transfer route includes the second clutch, the second input shaft, the second gear engaging mechanism, and the second speed-change gear group. The oil pump is connected to the prime motor. The first pressure regulating device is arranged in an oil passage connected to an outlet of the oil pump and configured to regulate hydraulic pressure of a hydraulic oil discharged from the oil pump. The first switching valve is arranged downstream of the first pressure regulating device in the oil passage. The first switching valve is configured to supply the hydraulic pressure of the hydraulic oil regulated by the first pressure regulating device to the second clutch in a state where the first switching valve is located at a first position connected to a first oil passage to supply the hydraulic pressure of the hydraulic oil regulated by the first pressure regulating device among oil passages. The first switching valve is configured to supply the hydraulic pressure of the hydraulic oil regulated by the first pressure regulating device to the second gear engaging mechanism in the second transfer route so as to engage any one of speed-change gears of the second speed-change gear group including a speed-change gear having a minimum transmission ratio with the second input shaft and the at least one output shaft in a state where the first switching valve is located at a second position connected to a second oil passage to supply the hydraulic pressure of the hydraulic oil regulated by the first pressure regulating device among the oil passages. The first switching device is configured to switch the first switching valve from the first position connected to the first oil passage to the second position connected to the second oil passage in a state where the first switching device is energized. The first anomaly determination device is configured to determine whether high-pressure anomaly has occurred in the first pressure regulating device. The high-pressure anomaly is to cause the first pressure regulating device to perform regulation to high pressure only. The energization interrupting device is configured to interrupt energization to the first switching device in a case where the first anomaly determination device determines that the high-pressure anomaly has occurred in the first pressure regulating device and in a state where the first switching valve is located at the first position connected to the first oil passage so as to supply the hydraulic pressure of the hydraulic oil regulated by the first pressure regulating device to the second clutch.

According to further aspect of the present invention, a control apparatus of an automatic transmission includes a first anomaly determination device and an energization interrupting device. The first anomaly determination device is configured to determine whether high-pressure anomaly has occurred in a first pressure regulating device. The high-pressure anomaly is to cause the first pressure regulating device to perform regulation to high pressure only. The first pressure regulating device is arranged in an oil passage connected to an outlet of an oil pump and configured to regulate hydraulic pressure of a hydraulic oil discharged from the oil pump. The oil pump is connected to a prime motor. The energization interrupting device is configured to interrupt energization to a first switching device in a case where the first anomaly determination device determines that the high-pressure anomaly has occurred in the first pressure regulating device and in a state where a first switching valve is located at a first position connected to a first oil passage so as to supply the hydraulic pressure of the hydraulic oil regulated by the first pressure regulating device to a second clutch. The first switching valve is arranged downstream of the first pressure regulating device in the oil passage. The first switching valve is configured to supply the hydraulic pressure of the hydraulic oil regulated by the first pressure regulating device to the second clutch in a state where the first switching valve is located at the first position connected to the first oil passage to supply the hydraulic pressure of the hydraulic oil regulated by the first pressure regulating device among oil passages. The first switching valve is configured to supply the hydraulic pressure of the hydraulic oil regulated by the first pressure regulating device to a second gear engaging mechanism in a. second transfer route so as to engage any one of speed-change gears of a second speed-change gear group including a speed-change gear having a minimum transmission ratio with a second input shaft and at least one output shaft in a state where the first switching valve is located at a second position connected to a second oil passage to supply the hydraulic pressure of the hydraulic oil regulated by the first pressure regulating device among the oil passages. The second speed-change gear group is arranged between the second input shaft and the at least one output shaft. The second speed-change gear group is to change speed of second rotation of the second input shaft transmitted via the second clutch so as to transmit the second rotation to the at least one output shaft in a state where the second speed-change gear group is engaged with the second input shaft and the at least one output shaft using the second gear engaging mechanism. The second transfer route includes the second clutch, the second input shaft, the second gear engaging mechanism, and the second speed-change gear group. The first switching device is configured to switch the first switching valve from the first position connected to the first oil passage to the second position connected to the second oil passage in a state where the first switching device is energized.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4 is an explanatory chart that illustrates division of power supplies to solenoid valves in for example, FIG. 3.

FIG. 5 is an explanatory chart that illustrates energization (excitation) for establishing the first to eighth speed-change stages of the solenoid valves in for example, FIG. 3.

FIG. 9 is a circuit diagram of the hydraulic pressure supply circuit, which illustrates results of the process in the flowchart of FIG. 7 and the like.

DESCRIPTION OF THE EMBODIMENT

Figure 1:
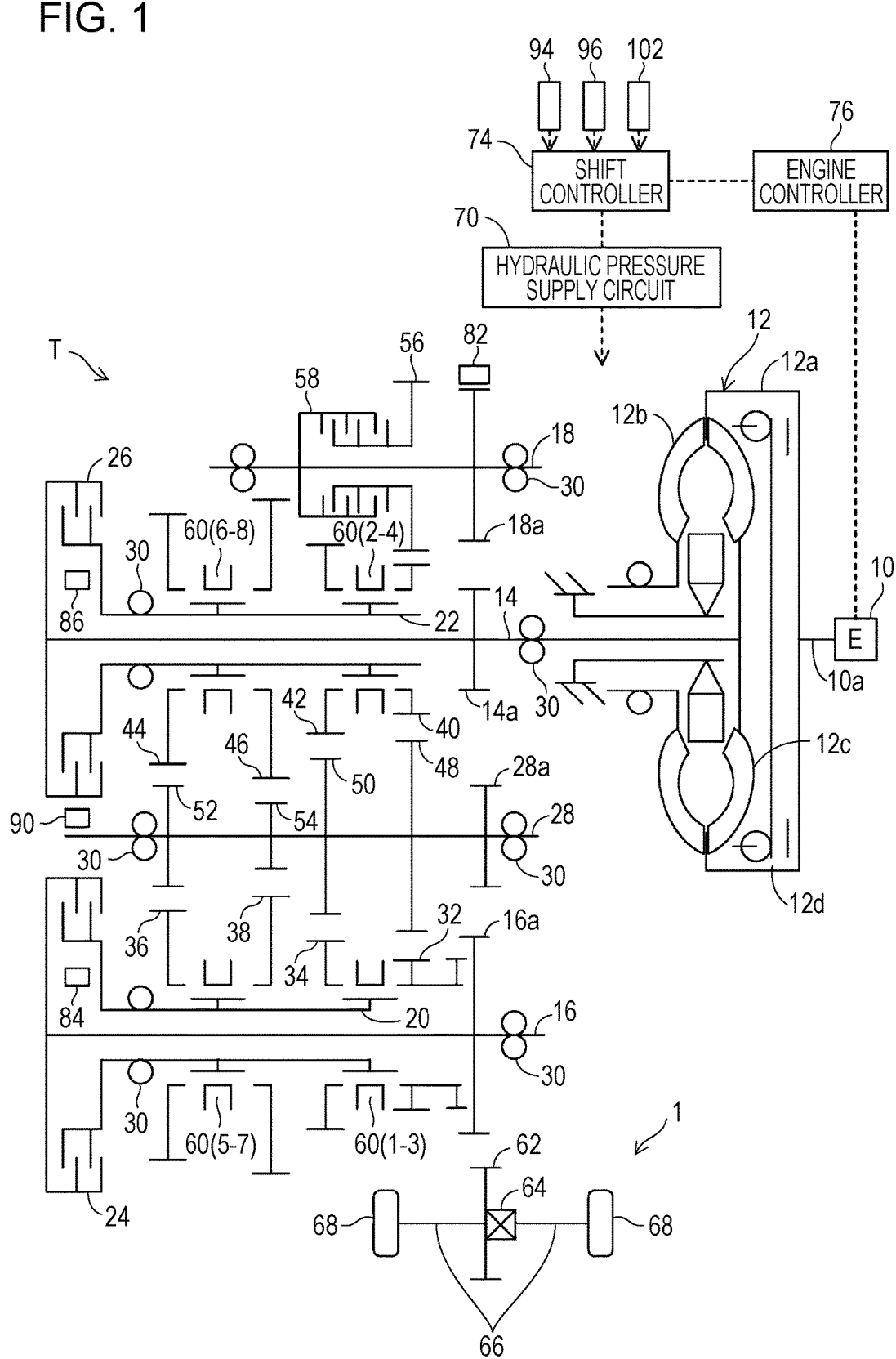
FIG. 1 is an overall schematic diagram that illustrates a control apparatus of an automatic transmission according to an embodiment of the present application.

The embodiments will now be described with reference to the accompanying drawings, wherein like reference numerals designate corresponding or identical elements throughout the various drawings.

An embodiment for implementing a control apparatus of an automatic transmission according to the present application is described below with reference to the accompanying drawings.

[Embodiment]

FIG. 1 is an overall schematic diagram that illustrates the control apparatus of the automatic transmission according to the embodiment of the present application.

In the description below, reference numeral 1 indicates a vehicle and an automatic transmission, which is hereinafter referred to as the "transmission", T is installed in the vehicle 1. The transmission T is for example, a twin-clutch transmission, which employs speed-change stages including eight gears for forward movement and one gear for backward movement and has ranges P, R, N, and D.

The transmission T includes an even-numbered stage input shaft 14 for the second, fourth, sixth, and eighth speed gears, which is connected to a drive shaft 10a connected to a crank shaft of an engine (a prime motor) 10 via a torque converter 12, and includes an odd-numbered stage input shaft 16 for the first, third, fifth, and seventh speed gears, which is parallel to the even-numbered stage input shaft 14. The engine 10 is for example, a spark-ignited internal combustion engine, which is powered by gasoline.

The torque converter 12 includes a pump impeller 12b fixed to a drive plate 12a directly connected to the drive shaft 10a of the engine 10, a turbine runner 12c fixed to the even-numbered stage input shaft 14, and a lockup clutch 12d, and the driving force (rotation) of the engine 10 is transferred to the even-numbered stage input shaft 14 via the torque converter 12 accordingly.

An idle shaft 18 is provided in parallel to the even-numbered stage input shaft 14 and the odd-numbered stage input shaft 16. The even-numbered stage input shaft 14 is connected to the idle shaft 18 via gears 14a and 18a while the odd-numbered stage input shaft 16 is connected to the idle shaft 18 via a gear 16a and the gear 18a. Accordingly, the even-numbered stage input shaft 14, the odd-numbered stage input shaft 16, and the idle shaft 18 rotate as the engine 10 rotates.

In addition, a first secondary input shaft 20 and a second secondary input shaft 22 are arranged coaxially and relatively rotatably on in outer peripheral portions of the odd-numbered stage input shaft 16 and the even-numbered stage input shaft 14.

The odd-numbered stage input shaft 16 and the first secondary input shaft 20 are connected via a first clutch 24 and input the rotation of the engine 10 via the first clutch 24 while the even-numbered stage input shaft 14 and the second secondary input shaft 22 are connected via a second clutch 26 and input the rotation of the engine 10 via the second clutch 26. Each of the first clutch 24 and the second clutch 26 is for example, a multiplate wet clutch that operates by being supplied with the pressure of a hydraulic oil, that is, the hydraulic pressure. The first clutch 24 and the second clutch 26 transfer the first secondary input shaft 20 and the second secondary input shaft 22 to the odd-numbered stage input shaft 16 and the even-numbered stage input shaft 14 when supplied with the hydraulic pressure and engaged.

An output shaft 28 is arranged between the even-numbered stage input shaft 14 and the odd-numbered stage input shaft 16 so as to be parallel to the even-numbered stage input shaft 14 and the odd-numbered stage input shaft 16. The even-numbered stage input shaft 14, the odd-numbered stage input shaft 16, the idle shaft 18, and the output shaft 28 are rotatably supported by a bearing 30.

A first speed drive gear 32, a third speed drive gear 34, a fifth speed drive gear 36, and a seventh speed drive gear 38 are fixed to the first secondary input shaft 20 on the odd-numbered stage side while a second speed drive gear 40, a fourth speed drive gear 42, a sixth speed drive gear 44, and an eighth speed drive gear 46 are fixed to the second secondary input shaft 22 on the even-numbered stage side.

A first-second speed driven gear 48 that meshes with the first speed drive gear 32 and the second speed drive gear 40, a third-fourth speed driven gear 50 that meshes with the third speed drive gear 34 and the fourth speed drive gear 42, a fifth-sixth speed driven gear 52 that meshes with the fifth speed drive gear 36 and the sixth speed drive gear 44, and a seventh-eighth speed driven gear 54 that meshes with the seventh speed drive gear 38 and the eighth speed drive gear 46 are fixed to the output shaft 28.

A reverse (RVS) idle gear 56 that meshes with the first-second speed driven gear 48 fixed to the output shaft 28 is rotatably supported by the idle shaft 18. The idle shaft 18 and the RVS idle gear 56 are connected via an RVS clutch 58. Similar to the first clutch 24 and the second clutch 26, the RVS clutch 58 is for example, a multiplate wet clutch, which operates by being supplied with hydraulic pressure.

A first-third speed gear engaging mechanism 60(1-3), which selectively causes the first speed drive gear 32 and the third speed drive gear 34 to engage with or be fixed to the first secondary input shaft 20, and a fifth-seventh speed gear engaging mechanism 60(5-7), which selectively causes the fifth speed drive gear 36 and the seventh speed drive gear 38 to engage with or be fixed to the first secondary input shaft 20 are supported by the odd-numbered stage input shaft 16.

A second-fourth speed gear engaging mechanism 60(2-4), which selectively causes the second speed drive gear 40 and the fourth speed drive gear 42 to engage with or be fixed to the second secondary input shaft 22, and a sixth-eighth speed gear engaging mechanism 60(6-8), which selectively causes the sixth speed drive gear 44 and the eighth speed drive gear 46 to engage with or be fixed to the second secondary input shaft 22 are supported by the even-numbered stage input shaft 14. Reference numeral 60 indicates the four gear engaging mechanisms collectively.

When the first clutch 24 or the second clutch 26 is engaged, the driving force of the engine 10 is transferred from the odd-numbered stage input shaft 16 to the first secondary input shaft 20 or from the even-numbered stage input shaft 14 to the second secondary input shaft 22, and is further transferred to the output shaft 28 via the drive gears and the driven gears described above.

In reversing, the driving force of the engine 10 is transferred to the output shaft 28 via the even-numbered stage input shaft 14, the gear 14a, the gear 18a, the RVS clutch 58, the idle shaft 18, the RVS idle gear 56, and the first-second speed driven gear 48. The output shaft 28 has a gear 28a that is connected to a differential mechanism 64 via a gear 62, and the differential mechanism 64 is connected to wheels (driving wheels) 68 via a drive shaft 66. The vehicle 1 is depicted with the wheels 68 and the like.

All the gear engaging mechanism 60 operates by being supplied with hydraulic pressure (shift force). A hydraulic pressure supply circuit 70 is provided so as to supply the hydraulic pressure (shift force) to the gear engaging mechanism 60, the first clutch 24, the second clutch 26, and the RVS clutch 58.

Figure 2:
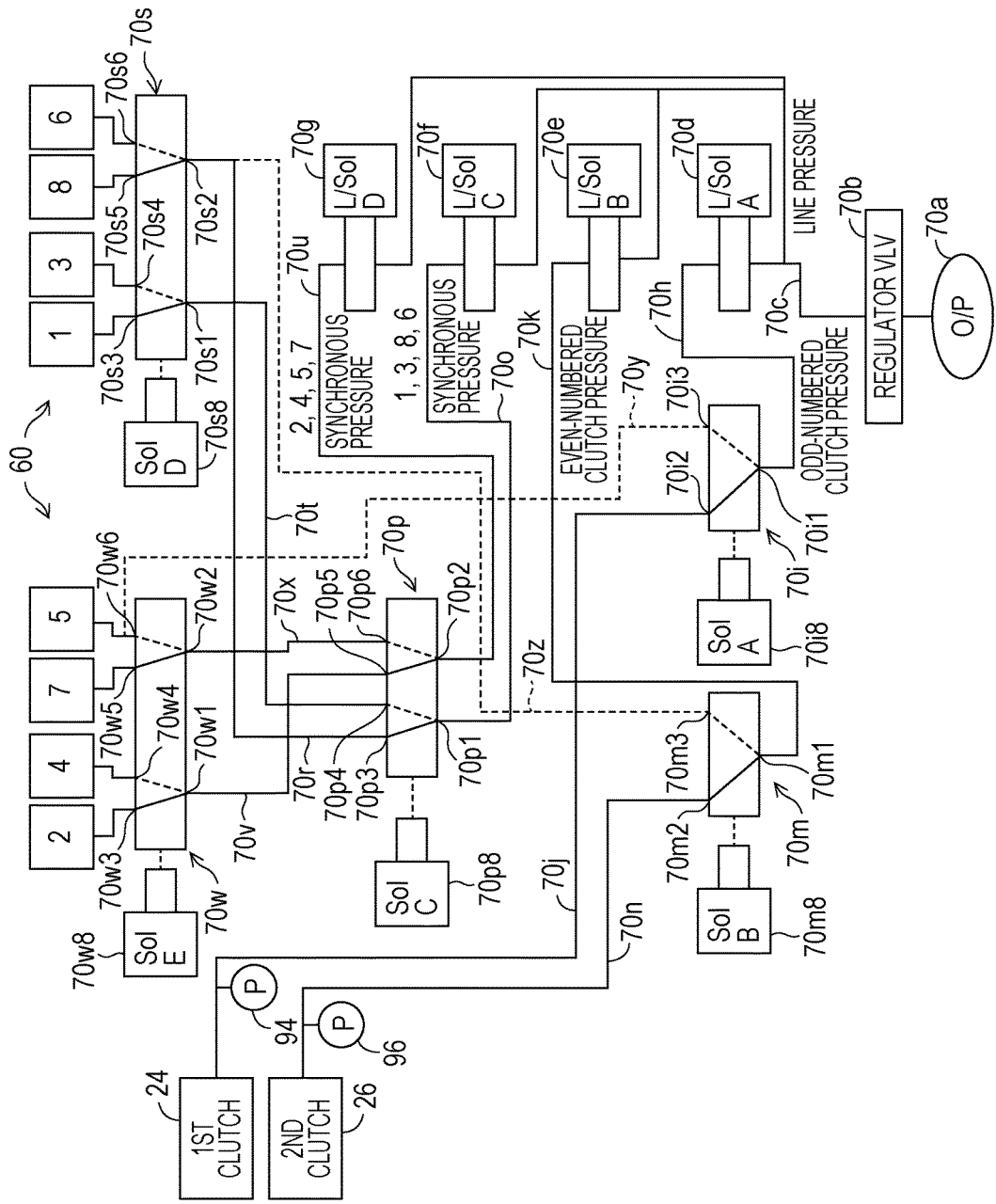
FIG. 2 is a circuit diagram that schematically illustrates part of a configuration of the hydraulic pressure supply circuit in FIG. 1.
Figure 3:
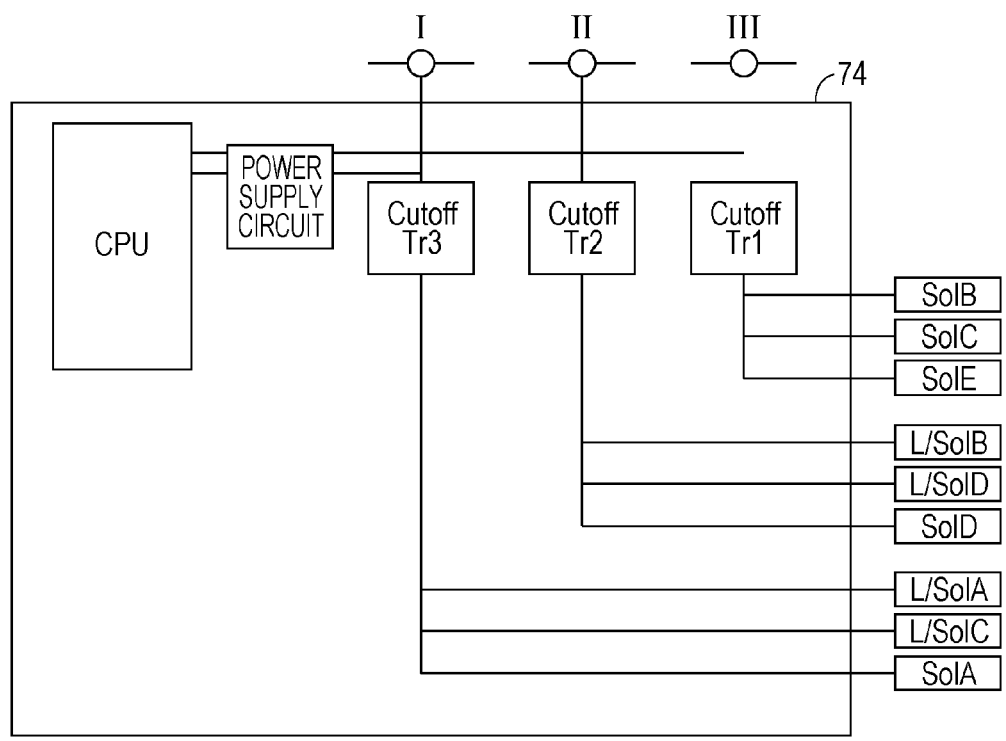
FIG. 3 is a block diagram that illustrates a configuration of the shift controller in FIG. 1, where a power supply system is mainly depicted.

FIG. 2 is a circuit diagram that illustrates a configuration of the hydraulic pressure supply circuit 70 in detail. FIG. 3 is a block diagram that illustrates a configuration of a shift controller 74 in FIG. 1, where a power supply system is mainly depicted. FIG. 4 is an explanatory chart that illustrates division of the power supplies to the solenoid valves in FIGS. 2 and 3. FIG. 5 is an explanatory chart that illustrates energization (excitation) for establishing the first to eighth speed-change stages.

Referring first to FIG. 2, in the hydraulic pressure supply circuit 70, the discharge pressure (hydraulic pressure) of a hydraulic oil ATF pumped by an oil pump (an oil carrying pump) 70a via a strainer from a reservoir, which is an oil pan formed in a lower portion of a case of the transmission, is regulated (reduced) by a regulator valve (a pressure regulating valve) 70b to line pressure.

Although the illustration is omitted, the oil pump 70a is coupled to the pump impeller 12b of the torque converter 12 via a gear and accordingly, the oil pump 70a is driven by the engine 10 and operates.

The line pressure after the regulation is sequentially transferred to the input ports of a linear solenoid valve (L/SolA) 70d, a linear solenoid valve (L/SolB) 70e, a linear solenoid valve (L/SolC) 70f, and a linear solenoid valve (L/SolD) 70g via an oil passage 70c connected to the outlet of the oil pump 70a.

The linear solenoid valves 70d to 70g are hydraulic pressure control valves, which are electromagnetic control valves and the above-described pressure regulating units, have characteristics to move a spool in proportion to the amount of the energization and change the output pressure from the output port so that the resultant pressure is linear, and are each configured as a normally-closed (N/C) type valve where the spool moves to an open position when energized.

The hydraulic pressure transferred to the linear solenoid valve 70d is regulated (reduced) to clutch pressure (odd-numbered clutch pressure) and transferred from the output port of the linear solenoid valve 70d to an input port 70i1 of a servo shift valve (a switching valve) 70i via an oil passage 70h.

Similarly, the hydraulic pressure transferred to the linear solenoid valve 70e is also regulated to clutch pressure (even-numbered clutch pressure) and transferred from the output port of the linear solenoid valve 70e to an input port 70m1 of a servo shift valve 70m, which is the above-described first switching valve, via an oil passage 70k.

The servo shift valves 70i and 70m are respectively connected to ON/OFF solenoid valves (SolA) 70i8 and (SolB) 70m8, which are hydraulic pressure control valves (electromagnetic control valves). When the ON/OFF solenoid valves 70i8 and 70m8 are not energized, that is, the solenoids are demagnetized, the plungers are at the OFF position and the spools of the servo shift valves 70i and 70m are not driven, and as indicated with the solid line in the drawings, the input ports 70i1 and 70m1 are connected to output ports 70i2 and 70m2, respectively, which are on the left side of the left-and-right pairs.

Accordingly, the clutch pressure is output from the output ports 70i2 and 70m2 and supplied to the first clutch 24 on the odd-numbered stage side and the second clutch 26 on the even-numbered stage side via oil passages 70j and 70n.

The first clutch 24 or the second clutch 26 is engaged when supplied with the clutch pressure, and connects the first secondary input shaft 20 or the second secondary input shaft 22 to the odd-numbered stage input shaft 16 or the even-numbered stage input shaft 14 and when hydraulic pressure is discharged, interrupts the connection (engagement) between the first second input shaft 20 or the second secondary input shaft 22 and the odd-numbered stage input shaft 16 or the even-numbered stage input shaft 14.

When the ON/OFF solenoid valves 70i8 and 70m8 are energized, that is, the solenoids are excited, the plungers project at each ON position and accordingly, the spools of the servo shift valves 70i and 70m are driven and as indicated with the dashed line in the drawings, the input ports 70i1 and 70m1 are connected to output ports 70i3 and 70m3, respectively, which are on the right side of the left-and-right pairs.

The hydraulic pressure transferred to the linear solenoid valve 70f is regulated (reduced) to synchronous pressure, is transferred from the output port of the linear solenoid valve 70f via an oil passage 70o to an input port 70p1, which is one of the input port 70p1 and an input port 70p2 illustrated on the left and right sides in the drawings, of a servo shift valve 70p, which is the above-described third switching valve, and is output from one of the output ports 70p3 and 70p4 of the pair on the left side, 70p3, which is included in the output ports 70p3 and 70p4 and output ports 70p5 and 70p6 of the two pairs illustrated on the left and right sides in the drawings, and is transferred via an oil passage 70r to an input port 70s2, which is one of an input port 70s1 and the input port 70s2 illustrated on the left and right sides in the drawings, of a servo shift valve 70s, which is the above-described second switching valve.

The hydraulic pressure (synchronous pressure) transferred from the linear solenoid valve 70f to one of the input ports of the servo shift valve 70p, which is the input port 70p1, via the oil passage 70o is output from the other output port of the pair, which is the output port 70p4, and transferred to the other input port of the servo shift valve 70s, which is the input port 70s1, via an oil passage 70t.

Similarly, the hydraulic pressure transferred to the linear solenoid valve 70g is regulated to synchronous pressure and transferred from the output port of the linear solenoid valve 70g via an oil passage 70u to the input port 70p2, which is the other one of the input ports of the servo shift valve 70p, and then output from the output port 70p5, which is one of the pair of the output ports 70p5 and 70p6 on the right side, and transferred via an oil passage 70v to an input port 70w1, which is one of the input port 70w1 and an input port 70w2 of a servo shift valve (switching valve) 70w illustrated on the left and right sides in the drawings, while the output from the other output port 70p6 is transferred via an oil passage 70x to the other input port 70w2 of the servo shift valve 70w.

The hydraulic pressure (synchronous pressure) input from the input port 70s1 of the servo shift valve 70s is connected to respective piston chambers of the first-third speed gear engaging mechanism 60(1-3) from the left pair of the output ports 70s3 and 70s4 included in the two pairs of the output ports 70s3, 70s4, 70s5, and 70s6 illustrated on the left and right sides in the drawings, and the outputs from the other output ports 70s5 and 70s6 are transferred to respective piston chambers of the sixth-eighth speed gear engaging mechanism 60(6-8).

Similarly, the hydraulic pressure input from the input port 70w1 of the servo shift valve 70w is connected to respective piston chambers of the second-fourth speed gear engaging mechanism 60(2-4) from the left pair of the output ports 70w3 and 70w4 included in the two pairs of the output ports 70w3, 70w4, 70w5, and 70w6 illustrated on the left and right sides in the drawings, and the outputs from the other output ports 70w5 and 70w6 are transferred to respective piston chambers of the fifth-seventh speed gear engaging mechanism 60(5-7).

Although the illustration is omitted, the gear engaging mechanism 60 includes a piston arranged so as to face a cylinder and the inside thereof laterally, and depending on the direction in which the synchronous pressure is supplied from the servo shift valves 70s and 70w, the piston moves laterally if explained using the drawings.

That is, the servo shift valves 70p, 70s, and 70w are connected to ON/OFF solenoid valves (SolC) 70p8, (SolD) 70s8, and (SolE) 70w8, which are the hydraulic pressure control valves (electromagnetic control valves), respectively, and when the servo shift valves 70p, 70s, and 70w are not energized, the spools of the servo shift valves 70p, 70s, and 70w are not driven and as indicated with the solid line in the drawings, the input ports 70p1, 70p2, 70s1, 70s2, 70w1, and 70w2 are connected to the output ports 70p3, 70p5, 70s3, 70s5, 70w3, and 70w5 on the left side, which are included in the left and right pairs of the output ports (positions) illustrated in the drawings.

In the servo shift valves 70p, 70s, and 70w, when the ON/OFF solenoid valves (SolC) 70p8, (SolD) 70s8, and (SolE) 70w8 are energized, the plungers project at each ON position and the spools of the servo shift valves 70p, 70s, and 70w are driven accordingly, and as indicated with the dashed line in the drawings, the input ports 70p1, 70p2, 70s1, 70s2, 70w1, and 70w2 are connected to the output ports 70p4, 70p6, 70s4, 70s6, 70w4, and 70w6 on the right side, which are included in the left and right pairs of the output ports (positions).

Also in the above-described servo shift valves 70i and 70m, when the corresponding ON/OFF solenoid valves 70i8 and 70w8 are excited, as indicated with the dashed lines, the other output port 70i3 of the servo shift valve 70i is connected to the piston chamber on the side of the fifth speed gear of the fifth-seventh speed gear engaging mechanism 60(5-7) via an oil passage 70y and the other output port 70m3 of the servo shift valve 70m is connected to the input port 70s2 of the servo shift valve 70s via an oil passage 70z.

As illustrated in FIG. 3, the ON/OFF solenoid valves and the above-described linear solenoid valves are connected to three units of power supply circuits via cutoff transistors Cutoff Tr1 to Cutoff Tr3 and the supply of power is interrupted by stopping the energization to base terminals of the cutoff transistors.

In the illustrated twin-clutch the transmission T, when range D is selected by the driver, the speed is changed by supplying hydraulic pressure to any one of the gear engaging mechanisms of the gear engaging mechanism 60 corresponding to the next speed-change stage so that any one of the first secondary input shaft 20 and the second secondary input shaft 22 is engaged or pre-shifted, and then discharging the hydraulic pressure from one of the first clutch 24 and the second clutch 26 on the side corresponding to the current speed-change stage and supplying hydraulic pressure to the other one of the first clutch 24 and the second clutch 26 on the side corresponding to the secondary input shaft included in the first secondary input shaft 20 and the second secondary input shaft 22, which corresponds to the next speed-change stage, so that the even-numbered stage input shaft 14 or the odd-numbered stage input shaft 16 is engaged.

The speed change is basically performed between the odd-numbered stage, which is the first, third, fifth, or seventh speed gear and the even-numbered stage, which is the second, fourth, sixth, or eighth speed gear, alternately. Although the illustration is omitted, the cylinders of the gear engaging mechanism 60 are connected to a shift fork and the shift fork is connected to a detent mechanism that includes a depressed and projecting surface, and when driven to any one of the opposite speed-change stages or the neutral position therebetween, the shift fork is engaged with the depressed portion of the detent mechanism and thus the driven position may be held even when the supply of the hydraulic pressure is stopped.

When range P or N is selected by the driver, range P or N is established by stopping (turning off) the energization to the linear solenoid valves (L/SolA) 70d and (L/SolB) 70e while starting (turning on) the energization to the ON/OFF solenoid valves (SolA) 70i8 and (SolB) 70m8.

When range R is selected by the driver, the RVS clutch 58 is engaged and range R is established by stopping (turning off) the energization to the linear solenoid valve (L/SolA) 70d and performing (turning on) the energization to the linear solenoid valve (L/SolB) 70e and the energization to the ON/OFF solenoid valves (SolA) 70i8, (SolB) 70m8, and (SolE) 70w8.

The hydraulic pressure supply circuit 70 includes a plurality of linear solenoid valves and the like in addition to the above-described components and the engagement or disengagement of the lockup clutch 12d of the torque converter 12 is controlled through the excitation or demagnetization thereof. However, the description thereof is omitted because such linear solenoid valves and the like do not directly relate to the present application.

Returning to the description of FIG. 1, the transmission T includes the shift controller 74. The shift controller 74 is configured as an electronic control unit (ECU) that includes a microcomputer. Further, an engine controller 76 configured as an ECU that similarly includes a microcomputer so as to control the operations of the engine 10 is provided.

The shift controller 74 is configured so as to be capable of communicating with the engine controller 76 and obtains information on the number of engine revolutions, the degree of throttle opening, an accelerator position (AP), and the like from the engine controller 76.

The transmission T is provided with a first number-of-revolutions sensor 82, a second number-of-revolutions sensor 84, a third number-of-revolutions sensor 86, and a fourth number-of-revolutions sensor 90, which each output a signal indicating the number of input revolutions NM of the transmission T, a signal indicating the numbers of revolutions of the first secondary input shaft 20 and the second secondary input shaft 22, and a signal indicating the number of revolutions NC of the output shaft 28, which is the number of output revolutions of the transmission T, that is, vehicle speed V, respectively.

A first pressure sensor 94 and a second pressure sensor 96 are arranged in the oil passage connecting to the first clutch 24 and the second clutch 26 of the hydraulic pressure supply circuit 70 and each output a signal indicating pressure (hydraulic pressure) of the hydraulic oil ATF supplied to the first clutch 24 and the second clutch 26.

A range selector position sensor 102 is arranged near a range selector, which is not illustrated but provided at the driver's seat in the vehicle 1, and outputs a signal indicating the range operated (selected) by the driver from among the ranges that are presented in order as P, R, N, and D when viewed from the driver.

All the outputs of the above-described sensors are input to the shift controller 74. Based on the outputs of the above-described sensors and the information obtained through the communication with the engine controller 76, the shift controller 74 controls the operations of the transmission T by exciting or demagnetizing the linear solenoid valve 70d or the like and controlling the operations of the first clutch 24, the second clutch 26, and the gear engaging mechanism 60.

The operations of the apparatus according to the present embodiment are described below.

The present embodiment is aimed at ensuring continuous travel of the vehicle 1 in a case where anomaly has occurred in the hydraulic pressure supply circuit 70 by taking a possibility that the anomaly may become failure into account, and first, a case where high-pressure anomaly has occurred in the linear solenoid valve 70e is described.

Figure 6:
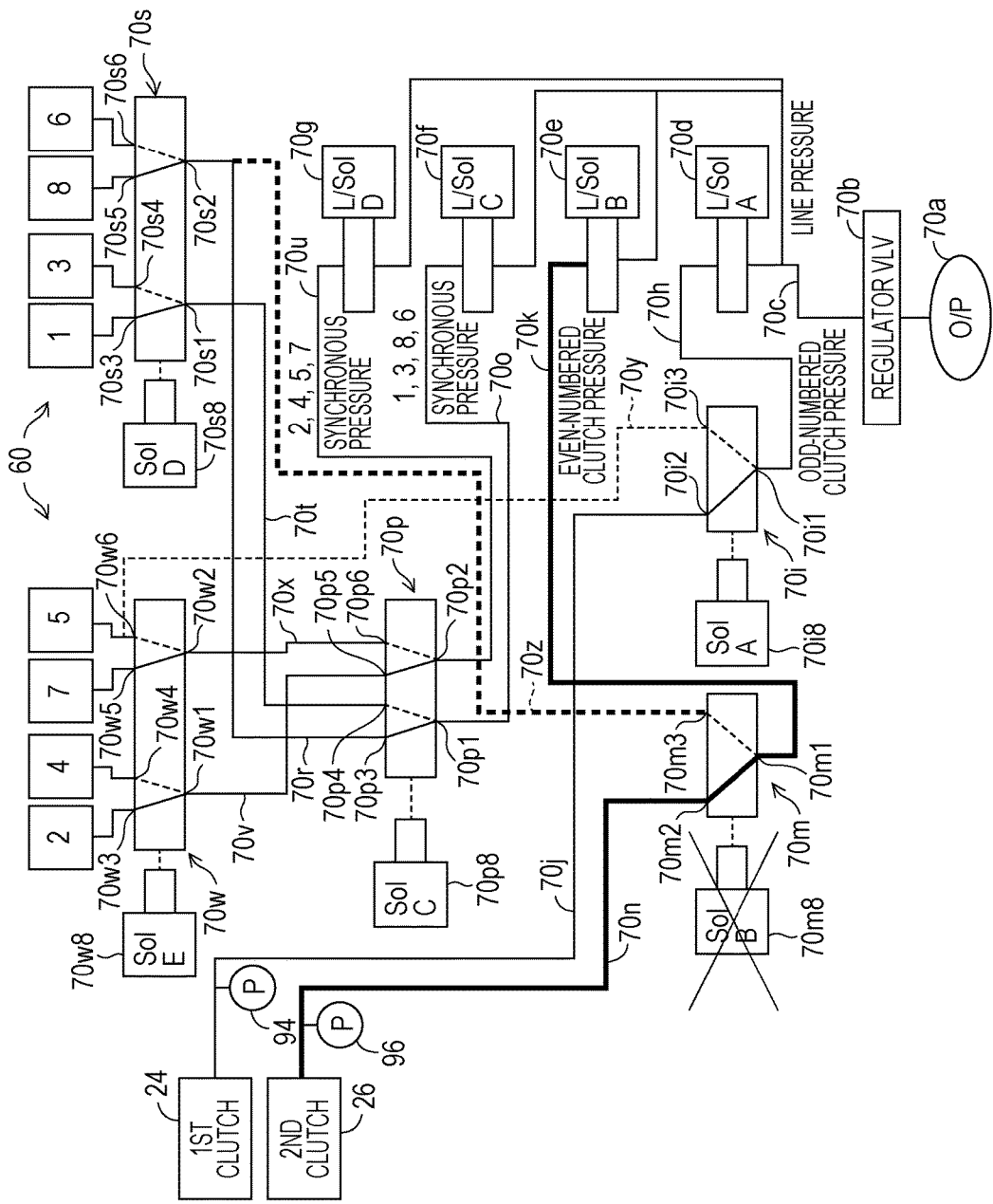
FIG. 6 is a circuit diagram of a hydraulic pressure supply circuit, which illustrates operations of the apparatus according to the present embodiment and is similar to FIG. 2.

FIG. 6 is a circuit diagram of the hydraulic pressure supply circuit 70, which illustrates the operations thereof and is similar to FIG. 2.

Referring also to FIGS. 1 and 2, the apparatus according to the present embodiment includes the first input shaft and the second input shaft (the odd-numbered stage input shaft 16, the first secondary input shaft 20, the even-numbered stage input shaft 14, and the second secondary input shaft 22) that input the rotation of the engine 10 installed in the vehicle 1 via the first clutch 24 and the second clutch 26, at least one output shaft, 28, arranged in parallel to the first input shaft and the second input shaft, a plurality of first speed-change gear groups, 32(48), 34(50), 36(52), and 38(54), which are arranged between the first input shaft and the output shaft, and when engaged with the first input shaft and the output shaft by the first gear engaging mechanism, 60(1-3) or 60(5-7), are capable of changing the speed of the rotation of the first input shaft input via the first clutch 24 and transferring the rotation to the output shaft, a plurality of second speed-change gear groups, 40(48), 42(50), 44(52), and 46(54), which are arranged between the second input shaft and the output shaft and when engaged with the second input shaft and the output shaft by the second gear engaging mechanism, 60(2-4) or 60(6-8), are capable of changing the speed of the rotation of the second input shaft input via the second clutch 26 and transferring the rotation to the output shaft, a first transfer route, which is made up of the first clutch, the first input shaft, the first gear engaging mechanism, and the first speed-change gear group, a second transfer route, which is made up of the second clutch, the second input shaft, the second gear engaging mechanism, and the second speed-change gear group, and the oil pump 70a connected to the engine 10.

The apparatus further includes the linear solenoid valve (L/SolB) 70e, which is the first pressure regulating unit, arranged in the oil passage 70c connected to the outlet of the oil pump 70a and capable of regulating the hydraulic pressure of the hydraulic oil discharged from the oil pump 70a, the servo shift valve 70m, and the ON/OFF solenoid valve (SolB) 70m8, which is the first switching unit, switching the destination of the connection of the servo shift valve 70m when energized.

The servo shift valve 70m is arranged downstream of the linear solenoid valve 70e in the oil passage 70c, is capable of inputting the supply of the hydraulic pressure (clutch pressure) of the hydraulic oil regulated by the linear solenoid valve 70e from the input port 70m1 and switching the supply from a plurality of output ports, 70m2 and 70m3, among a plurality of oil passages, when being at a position connected to one of the plurality of oil passages, supplies the hydraulic pressure of the hydraulic oil to the second clutch 26, when being at a position connected to another one of the plurality of oil passages, supplies the hydraulic pressure of the hydraulic oil to the second gear engaging mechanism in the second transfer route via the oil passage 70z and via the input port 70s2 and the output ports 70s5 and 70s6 of the servo shift valve 70s, to be precise, to the sixth-eighth speed gear engaging mechanism 60(6-8) via the input port 70s2 and the output port 70s5 of the servo shift valve 70s for the reason that the ON/OFF solenoid valve 70s8 is not energized at normal times (is turned off) as described in FIG. 5, and causes any one of the speed-change gears of the second speed-change gear group including a speed-change gear with a minimum transmission ratio (the eighth speed drive gear 46 and the seventh-eighth speed driven gear 54), to be precise, the eighth speed gear to engage with the second input shaft (14 and 22) and the output shaft 28.

According to the above-described configuration, in a case where high-pressure anomaly has occurred in the linear solenoid valve (L/SolB) 70e, if the ON/OFF solenoid valve (SolB) 70m8 has broken down at a next fail, there arises a possibility that the other output port 70m3 of the servo shift valve 70m may be connected to the servo shift valve 70s via the oil passage 70z and then the hydraulic pressure of the hydraulic oil may be supplied to the sixth-eighth speed gear engaging mechanism 60(6-8) and the eighth speed gear may be engaged with (connected to) the second input shaft (14 and 22) and the output shaft 28, and as a result, continuous travel of the vehicle 1 may be difficult.

Figure 7:
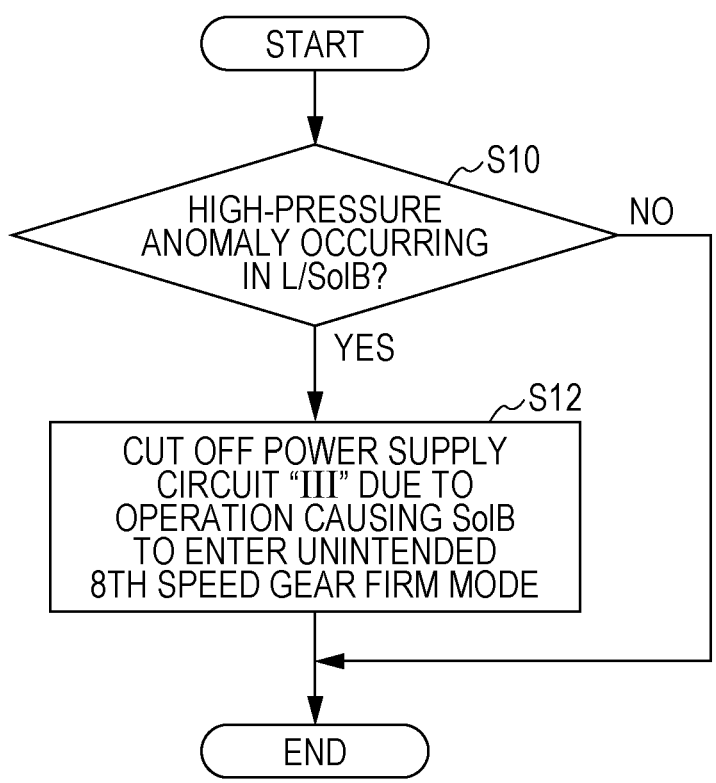
FIG. 7 is a flowchart that similarly illustrates the operations of the apparatus according to the present embodiment.
Figure 8:
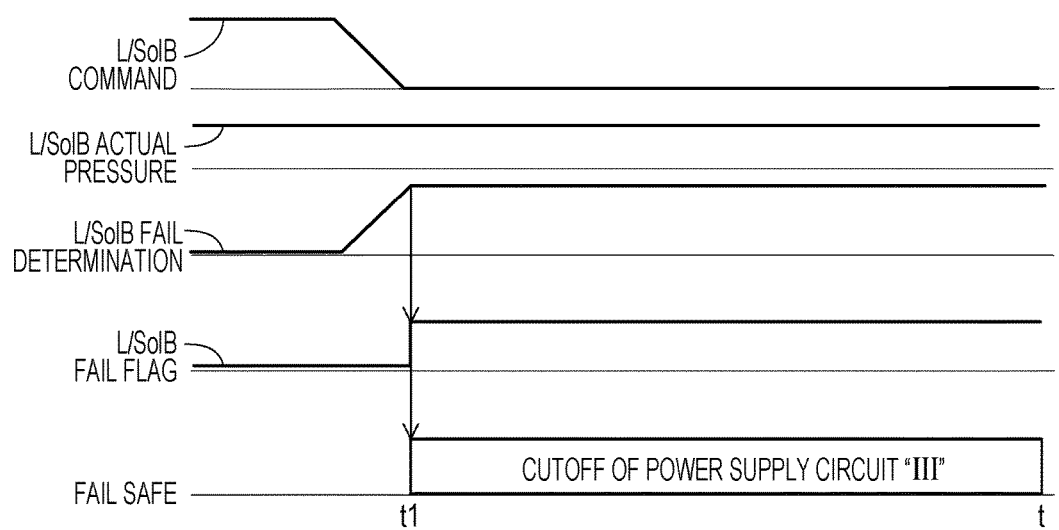
FIG. 8 is a time chart that illustrates the process in the flowchart of FIG. 7.

In view of the above-described points, the present embodiment is made as illustrated in the flowchart of FIG. 7. FIG. 8 is a time chart that illustrates the process in the flowchart of FIG. 7.

Referring to the flowchart of FIG. 7, first in S10, where S represents a step in the process, it is determined whether or not high-pressure anomaly that causes regulation to high pressure only has occurred for the reason that for example, the spool of the linear solenoid valve (L/SolB) 70e had involved a foreign substance and become fixed to an open position.

As illustrated in FIG. 8, the determination is performed by determining whether or not there is a difference between a command given to the linear solenoid valve (L/SolB) 70e, which is command pressure that equates an energization command value, and actual pressure detected by the second pressure sensor 96.

When the result is NO in S10, the remaining steps of the process are skipped and when the result is YES in S10 with the determination that high-pressure anomaly has occurred, the process proceeds to S12 and when the vehicle 1 travels with the hydraulic pressure of the hydraulic oil, which is supplied to the second clutch 26 in a state where one of the output ports, 70m2, functions as the output port of the servo shift valve 70m, the energization to the base terminal of the transistor Cutoff Tr1 illustrated in FIG. 3 is stopped and the energization to the ON/OFF solenoid valve (SolB) 70m8 is interrupted.

That is, when the first to eighth speed-change gears are provided and if it is determined that high-pressure anomaly, which causes regulation to high pressure only, has occurred in the linear solenoid valve (L/SolB) 70e, and when the servo shift valve 70m is at a position connected to one of the output ports, 70m2, and supplies the hydraulic pressure of the hydraulic oil to the second clutch (26) on the even-numbered stage side for the travel, and if the anomaly of the linear solenoid valve 70e becomes failure of the ON/OFF solenoid valve (SolB) 70m8 (see time t1 in FIG. 8), there arises a possibility that the servo shift valve 70m may be driven by itself and the position connected to the output ports 70m2 may be changed to the position connected to the other output port 70m3, and the hydraulic pressure is supplied via the oil passage 70z to engage any one of the speed-change gears of the second speed-change gear group including a speed-change gear with a minimum transmission ratio, which is for example, the eighth speed gear, and as a result, continuous travel of the vehicle 1 may be difficult.

Figure 9:
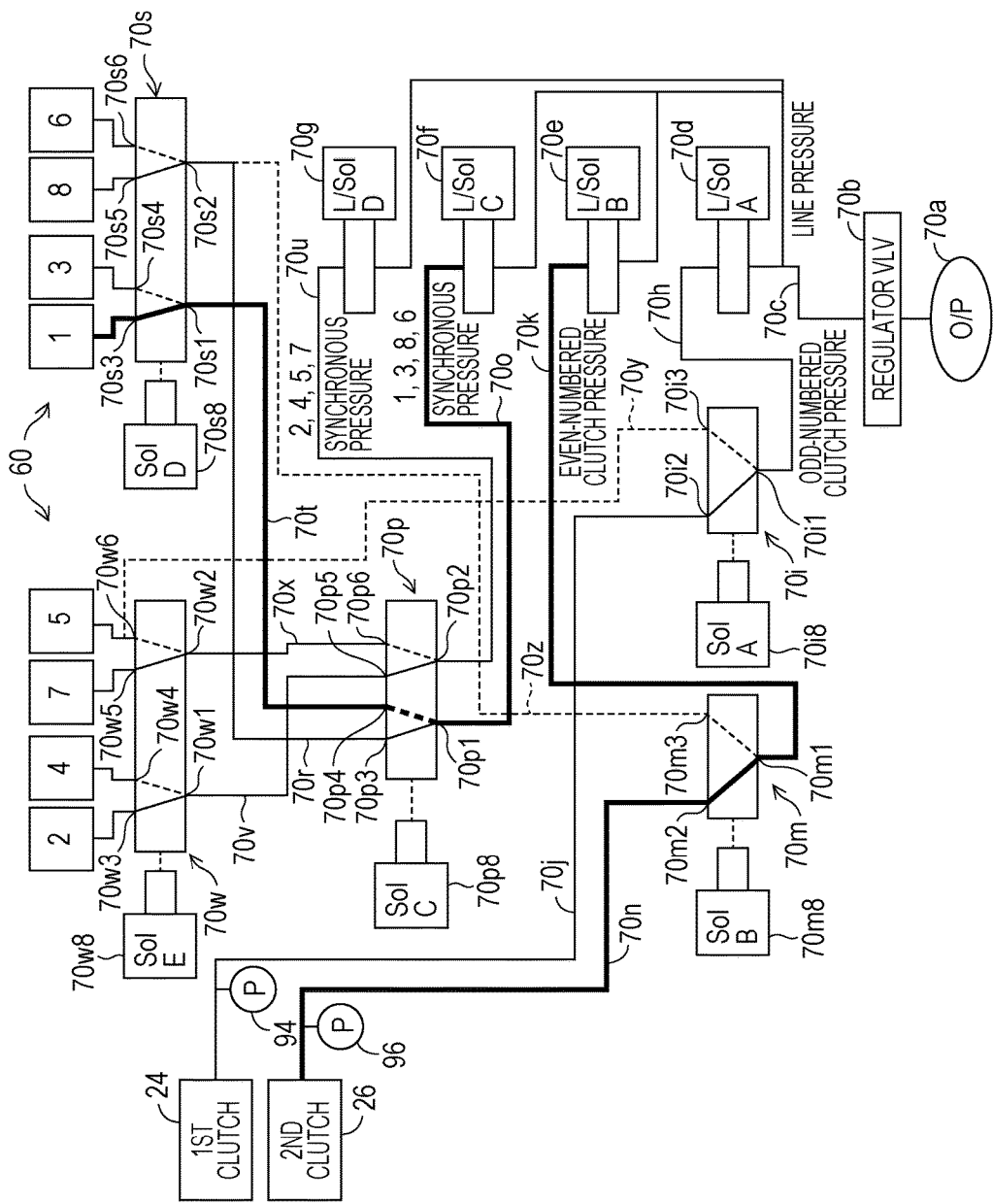

However, it is possible to inhibit the engagement of the eighth speed gear with the even-numbered stage by interrupting the energization to the ON/OFF solenoid valve (SolB) 70m8 in advance before the anomaly becomes failure, and also possible to ensure the travel of the vehicle 1 by operating the linear solenoid valve (L/SolA) 70d to supply the clutch pressure to the first clutch 24 while as illustrated in FIG. 9, operating the linear solenoid valve (L/SolC) 70f and the ON/OFF solenoid valve (SolC) 70p8 and switching the output port of the servo shift valve 70p from the output port 70p3 to the output port 70p4 to supply the synchronous pressure to the first-third speed gear engaging mechanism 60(1-3) from the input port 70s1 of the servo shift valve 70s via the output port 70s3, and selecting the first gear.

Described below is a case where high-pressure anomaly, such as disconnection or a short circuit, has occurred in the ON/OFF solenoid valve (SolC) 70p8.

Figure 10:
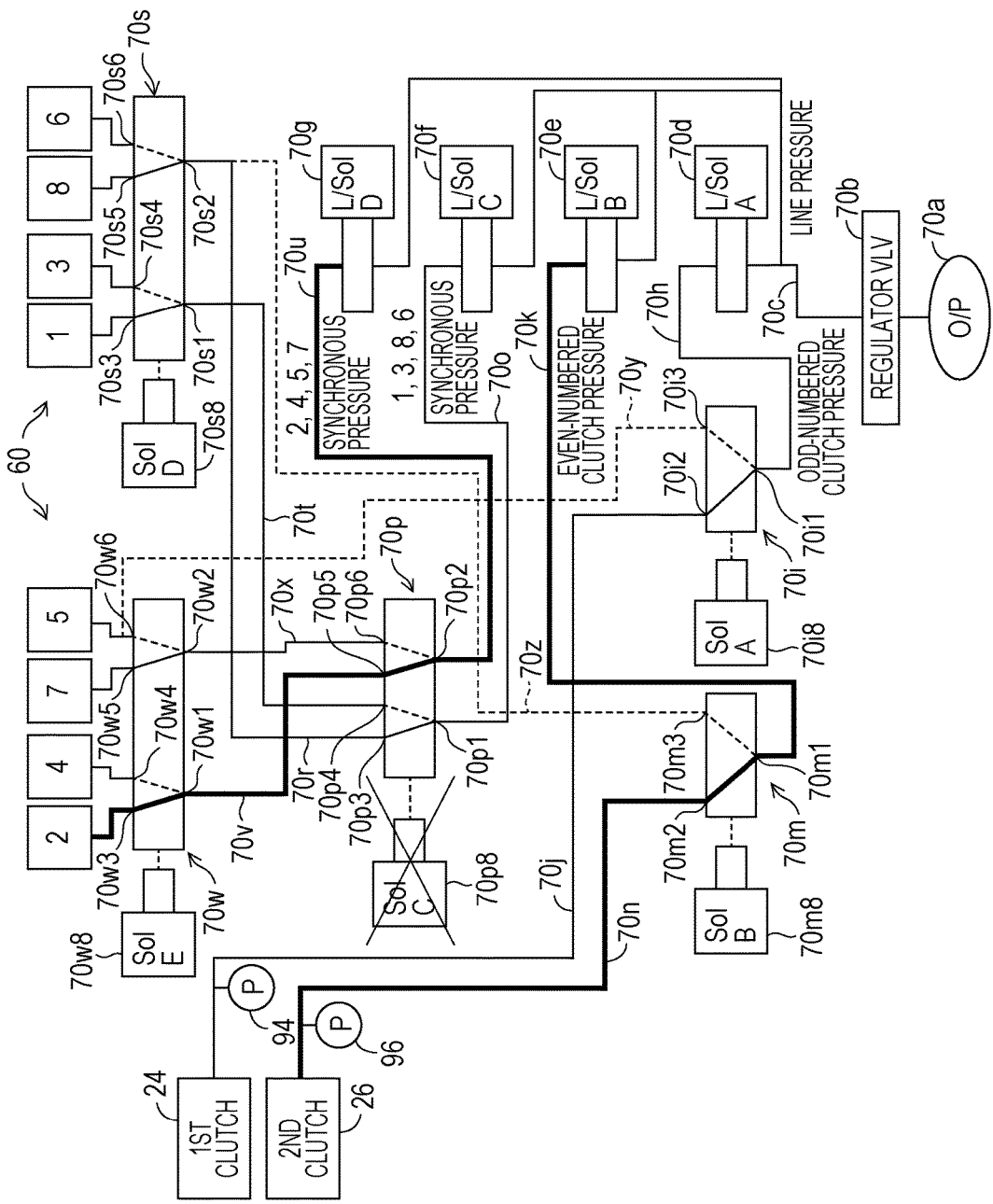
FIG. 10 is a circuit diagram of a hydraulic pressure supply circuit, which illustrates other operations of the apparatus according to the present embodiment and is similar to FIG. 2.

FIG. 10 is a circuit diagram of the hydraulic pressure supply circuit 70, which illustrates the operations performed in such a case.

As illustrated in FIG. 10, in addition to the above-described configuration, the apparatus according to the present embodiment includes the linear solenoid valve (L/SolD) 70g (the second pressure regulating unit), which is arranged in the oil passage 70c connected to the outlet of the oil pump 70a and is capable of regulating the hydraulic pressure of the hydraulic oil discharged from the oil pump 70a, the servo shift valve 70w (the second switching valve), the servo shift valve 70p (the third switching valve), and the ON/OFF solenoid valve (SolE) 70w8 (the second switching unit), which when energized, switches the position of the servo shift valve 70w, and the ON/OFF solenoid valve (SolC) 70p8 (the third switching unit), which when energized, switches the servo shift valve 70p from the position connected to one of the plurality of oil passages to the position connected to another one of the plurality of oil passages.

The third switching valve 70p is arranged downstream of the linear solenoid valve 70g in the oil passage 70c, is capable of switching the supply of the hydraulic pressure of the hydraulic oil regulated by the linear solenoid valve 70g among the oil passages 70v and 70x, and is capable of changing from the position connected to one of the oil passages, 70v, to the position connected to the other oil passage 70x, when being at the position connected to the one oil passage 70v, supplies the hydraulic pressure of the hydraulic oil to the second gear engaging mechanism, 60(2-4), in the second transfer route via the second switching valve 70w and causes any one of the speed-change gears of the second speed-change gear group, 40(48) and 42(50), more specifically, any one of the speed-change gears including the speed-change gear with a large transmission ratio, 40(48), to engage with the second input shafts, 14 and 22, and the output shaft 28, and when being at the position connected to the other oil passage 70x, supplies the hydraulic pressure of the hydraulic oil to the first gear engaging mechanism, 60(5-7), in the first transfer route via the second switching valve 70w and causes any one of the speed-change gears of the first speed-change gear group, 36(52) and 38(54), more specifically, the speed-change gear with a small transmission ratio, 38(54), to engage with the first input shaft, 16 and 20, and the output shaft 28.

If disconnection or a short circuit has occurred in the ON/OFF solenoid valve (SolC) 70p8 as illustrated in FIG. 10, when the energization to the ON/OFF solenoid valve (SolC) 70p8 is interrupted by stopping the energization to the base terminal of the cutoff transistor Cutoff Tr1 in FIG. 3, the energization to the other ON/OFF solenoid valves (SolB) 70m8 and (SolE) 70w8 that belong to the group connected to the cutoff transistor Cutoff Tr1, that is, connected to the identical power supply, is also interrupted.

Consequently, when any one of the speed-change gears of the speed-change gear group, 40(48) and 42(50), of the second gear engaging mechanism 60(2-4) is shifted from the neutral position by the servo shift valve (second switching valve) 70w, that is, is put in gear or at an intermediate position, engagement with the depressed portion of the detent mechanism occurs and when the second clutch 26 on the side of the second gear engaging mechanism is engaged for some reason, inconvenience of immobility at the speed stage may be caused.

Figure 11:
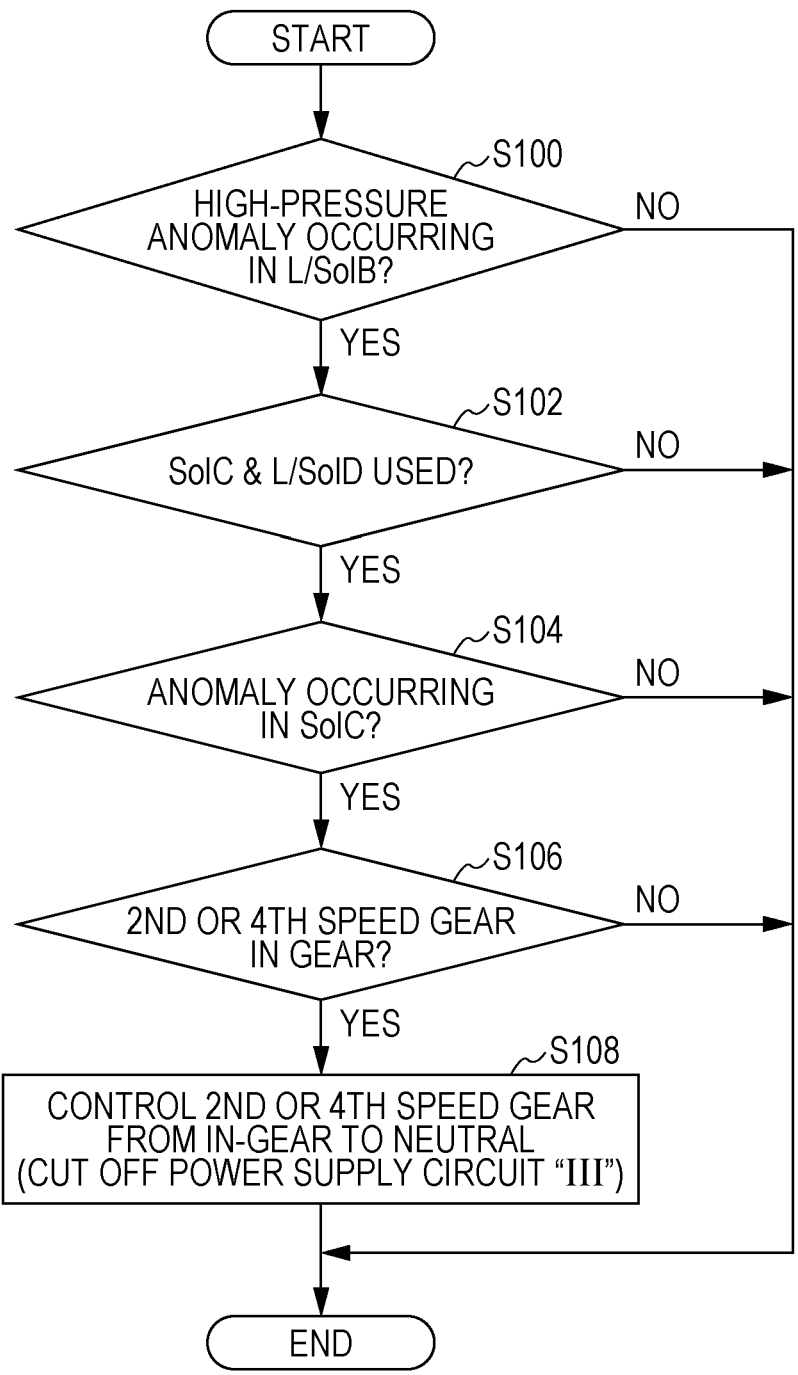
FIG. 11 is a flowchart that illustrates the operations in FIG. 10.
Figure 12:
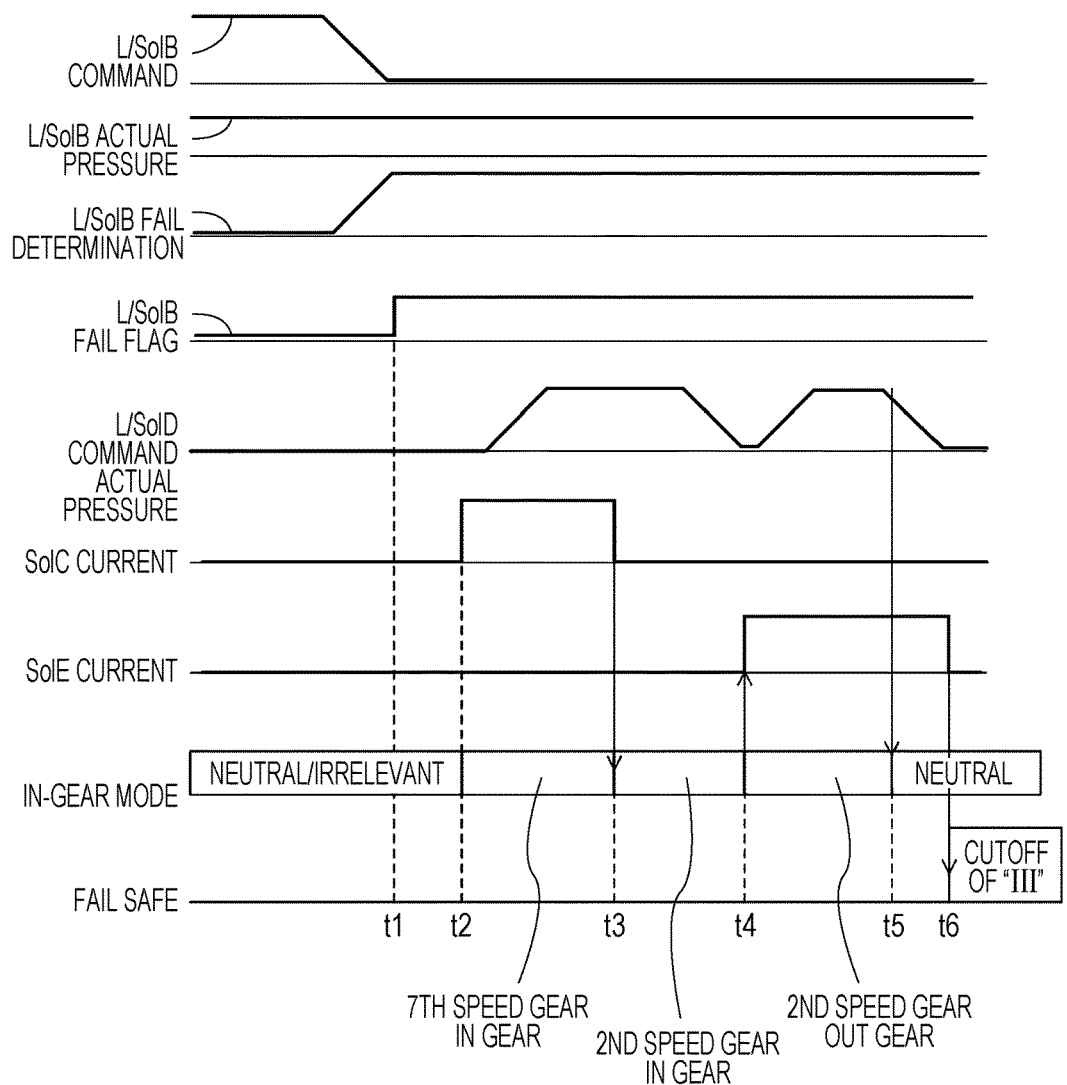
FIG. 12 is a time chart that illustrates the process in the flowchart of FIG. 11.

In view of the above-described points, the present embodiment is made as illustrated in the flowchart of FIG. 11. FIG. 12 is a time chart that illustrates the process in the flowchart of FIG. 11.

Referring to the flowchart of FIG. 11, first in S100, it is determined in the manner similar to S10 whether or not high-pressure anomaly has occurred in the linear solenoid valve (L/SolB) 70e, and when the result is NO, the remaining steps of the process are skipped.

Referring next to the time chart of FIG. 12, it is assumed here that since high-pressure anomaly has occurred in the linear solenoid valve (L/SolB) 70e (see time t1), the linear solenoid valve (L/SolA) 70d is energized to operate the first clutch 24 and the linear solenoid valve (L/SolD) 70g is energized to supply synchronous pressure while the ON/OFF solenoid valve (SolC) 70p8 is energized to move the spool of the servo shift valve 70p and transfer the hydraulic pressure of the hydraulic oil from the output port 70p6 to the servo shift valve 70w via the oil passage 70x and that it is attempted to put the fifth or seventh speed gear in gear (between time t2 and t3), more specifically, the seventh speed gear in gear via the input port 70w2 and the output port 70w5 using the first gear engaging mechanism 60(5-7).

That is, it is assumed that since high-pressure anomaly has occurred in the linear solenoid valve (L/SolB) 70e, the vehicle 1 attempts to travel by supplying the hydraulic pressure of the hydraulic oil to any one of the speed-change gears of the first gear engaging mechanism (60(5-7)) in the first transfer route, more specifically, the seventh speed gear.

After time t1 in the time chart of FIG. 12, the result of the determination in S100 is YES and the process proceeds to S102, and it is determined whether or not the ON/OFF solenoid valve (SolC) 70p8 and the linear solenoid valve (L/SolD) 70g are used, in other words, whether or not as described above, it is in the state where the supply of the hydraulic pressure of the hydraulic oil to the second gear engaging mechanism 60(2-4) in the second transfer route is attempted by switching the position connected to the one of the oil passages, 70v, (see around time t3) from the state where the servo shift valve 70p is connected to the other oil passage 70x and the hydraulic pressure of the hydraulic oil is supplied to the first gear engaging mechanism 60(5-7) in the first transfer route by switching the ON/OFF solenoid valve (SolC) 70p8 from the energization state to the non-energization state.

When the result is NO in S102, the remaining steps of the process are skipped, and when the result is YES, the process proceeds to S104 and it is determined whether or not anomaly of disconnection or a short circuit has occurred in the ON/OFF solenoid valve (SolC) 70p8.

When the result is NO in S104, the remaining steps of the process are skipped and as indicated by time t3 in the time chart of FIG. 12, when SolC current, which is current to energize the ON/OFF solenoid valve (SolC) 70p8, is zero regardless of the issue of an energization command, the result of the determination is YES in S104 and the process proceeds to S106, and it is determined whether or not the hydraulic pressure of the hydraulic oil is supplied to the second gear engaging mechanism, 60(2-4), and the second or fourth speed gear is in gear (between time t3 and time t4).

The second or fourth speed gear in gear implies not only the state in which the second or fourth speed gear is put in gear but the state in which the second or fourth speed gear is shifted toward the in-gear state, that is, is shifted from the neutral position.

When the result is NO in S106, the remaining steps of the process are skipped, and when the result is YES, the process proceeds to S108 and the ON/OFF solenoid valve (SolE) 70w8 is energized to drive the servo shift valve 70w and switch the output port from the output port 70w3 to the output port 70w4 and then, the hydraulic pressure of the hydraulic oil is supplied to the side opposite the gear engaging mechanism, 60(2-4), and the piston is returned to the neutral position (the out-gear state) (between time t4 and t6).

After that, at time t6, the energization to the base terminal of the transistor Cutoff Tr1 illustrated in FIG. 3 is stopped and the energization to the ON/OFF solenoid valve (SolC) 70p8 is interrupted. The interruption of the energization to the ON/OFF solenoid valve (SolC) 70p8 enables the occurrence of the inconvenience of the speed stage being fixed to (engaged with) the second speed gear to be inhibited.

As described above, according to the present embodiment, the control apparatus of the automatic transmission includes: the first input shaft and the second input shaft (16, 20, 14, and 22) that input the rotation of the prime motor (10) installed in the vehicle 1 via the first clutch 24 and the second clutch 26; at least one output shaft, 28, arranged in parallel to the first input shaft and the second input shaft; the plurality of first speed-change gear groups (32(48), 34(50), 36(52), and 38(54)) that are arranged between the first input shaft and the output shaft, and when engaged with the first input shaft and the output shaft by the first gear engaging mechanism (60(1-3) or 60(5-7)), are capable of changing the speed of the rotation of the first input shaft input via the first clutch and transferring the rotation to the output shaft; the plurality of second speed-change gear groups (40(48), 42(50), 44(52), and 46(54)) that are arranged between the second input shaft and the output shaft and when engaged with the second input shaft and the output shaft by the second gear engaging mechanism (60(2-4) or 60(6-8)), are capable of changing the speed of the rotation of the second input shaft input via the second clutch and transferring the rotation to the output shaft; the first transfer route made up of the first clutch, the first input shaft, the first gear engaging mechanism, and the first speed-change gear group; the second transfer route made up of the second clutch, the second input shaft, the second gear engaging mechanism, and the second speed-change gear group; the oil pump 70a connected to the prime motor; the first pressure regulating unit (linear solenoid valve (L/SolB) 70e) that is arranged in the oil passage 70c connected to the outlet of the oil pump and is capable of regulating the hydraulic pressure of the hydraulic oil discharged from the oil pump; the first switching valve (servo shift valve 70m) that is arranged downstream of the first pressure regulating unit in the oil passage, is capable of switching the supply of the hydraulic pressure of the hydraulic oil regulated by the first pressure regulating unit among the plurality of oil passages, when being at the position connected to one of the plurality of oil passages, supplies the hydraulic pressure of the hydraulic oil to the second clutch 26, when being at the position connected to another one of the plurality of oil passages, supplies the hydraulic pressure of the hydraulic oil to the second gear engaging mechanism (60(6-8)) in the second transfer route and causes any one of the speed-change gears of the second speed-change gear group including the speed-change gear with the minimum transmission ratio (46(54)) to engage with the second input shaft and the output shaft; the first switching unit (ON/OFF solenoid valve (SolB) 70m8) that when energized, switches the first switching valve (70m) from the position connected to the one of the plurality of oil passages to the position connected to the another one of the plurality of oil passages; an anomaly determination unit (see, e.g., shift controller (74) in conjunction with sensors (94, 96); S10) that determines whether high-pressure anomaly has occurred in the first pressure regulating unit (70e), the high-pressure anomaly causing the first pressure regulating unit (70e) to perform regulation to high pressure only; and an energization interrupting unit (see, e.g., shift controller (74); S12) that when the anomaly determination unit determines that the high-pressure anomaly has occurred in the first pressure regulating unit (70e) and when the first switching valve (70m) is at the position connected to the one of the plurality of oil passages and supplies the hydraulic pressure of the hydraulic oil to the second clutch 26, interrupts energization to the first switching unit (70m8). Accordingly, if anomaly has occurred in the hydraulic pressure supply circuit 70, it is possible to ensure continuous travel of the vehicle 1 while taking a possibility of the anomaly becoming failure into account.

That is, in a case where for example, the first to eighth speed-change gears are provided, when the first pressure regulating unit or the linear solenoid valve (L/SolB) 70e is made up of a solenoid valve and it is determined that high-pressure anomaly, which causes the first pressure regulating unit to perform regulation to high pressure only, has occurred in the first pressure regulating unit, and when the first switching valve or the servo shift valve 70m is connected to one of the oil passages and supplies the hydraulic pressure of the hydraulic oil to for example, the second clutch 26 on the even-numbered stage side, and if the anomaly of the first pressure regulating unit becomes failure, change in position from the position connected to the one oil passage to the position connected to another oil passage is caused and any one of the speed-change gears of the second speed-change gear group including a speed-change gear with a minimum transmission ratio, which is for example, the eighth speed gear 46 (54), is engaged and as a result, there arises a possibility that continuous travel of the vehicle will be difficult. However, when the energization to the first switching unit or the ON/OFF solenoid valve (SolB) 70m8 is interrupted in advance before the anomaly becomes failure, the engagement with the even-numbered stages, which include the second, fourth, sixth, and above-mentioned eighth speed gears, may be inhibited. Since in contrast, engagement with the first, third, fifth, and seventh speed gears of the odd-numbered stages is possible, travel of the vehicle may be ensured by selecting any one of the gears on the odd-numbered stage side.

The control apparatus further includes: the second pressure regulating unit (linear solenoid valve (L/SolD) 70*g*) that is arranged in the oil passage 70*c* connected to the outlet of the oil pump 70*a* and is capable of regulating the hydraulic pressure of the hydraulic oil discharged from the oil pump; the third switching valve (servo shift valve 70*p*) that is arranged downstream of the second pressure regulating unit in the oil passage, is capable of switching the supply of the hydraulic pressure of the hydraulic oil regulated by the second pressure regulating unit among the plurality of oil passages, when being at the position connected to the one of the plurality of oil passages, supplies the hydraulic pressure of the hydraulic oil to the second gear engaging mechanism (60(2-4)) in the second transfer route via the second switching valve (servo shift valve 70*w*) and causes any one of the speed-change gears of the second speed-change gear group (40(48) and 42(50)) to engage with the second input shaft (14 and 22) and the output shaft 28, when being at the position connected to the another one of the plurality of oil passages, supplies the hydraulic pressure of the hydraulic oil to the first gear engaging mechanism (60(5-7)) in the first transfer route via the second switching valve 70*w* and causes any one of the speed-change gears of the first speed-change gear group (36(52) and 38(54)) to engage with the first input shaft and the output shaft; a second switching unit (ON/OFF solenoid valve (SolE) 70*w*8) that when energized, switches the position of the second switching valve (servo shift valve 70*w*); the third switching unit (ON/OFF solenoid valve (SolC) 70*p*8) that when energized, switches the third switching valve (70*p*) from the position connected to the one of the plurality of oil passages to the position connected to the another one of the plurality of oil passages; an anomaly determination unit (see, e.g., shift controller (74) in conjunction with sensors (94, 96); S100, S102, S104, and S106) that determines whether anomaly of disconnection or a short circuit has occurred in the third switching unit (70*p*8) when it is determined that the high-pressure anomaly that causes the first pressure regulating unit (70*e*) to perform regulation to high pressure only has occurred in the first pressure regulating unit (70*e*) and the third switching valve (70*p*) is at the position connected to the another one of the plurality of oil passages and supplies the hydraulic pressure of the hydraulic oil to the first gear engaging mechanism (60(5-7)) in the first transfer route to cause any one of the speed-change gears of the first speed-change gear group (36(52) and 38(54)) to engage with the first input shaft and the output shaft; and a gear shift energization interrupting unit (see, e.g., shift controller (74); S108) that when the anomaly determination unit determines that the anomaly has occurred in the third switching unit (70*p*8) and determines that the third switching valve (70*p*) is connected to the one of the plurality of oil passages, supplies the hydraulic pressure of the hydraulic oil to the second gear engaging mechanism (60(2-4)), and shifts any one of the speed-change gears of the second speed-change gear group (40(48) and 42(50)) from the neutral position, and when the first switching unit, the second switching unit, and the third switching unit (70*m*8, 70*w*8, and 70*p*8) are connected to an identical power supply, energizes the second switching unit (70*w*8) and switches the position of the second switching valve (70*w*), supplies the hydraulic pressure of the hydraulic oil to the second gear engaging mechanism (60(2-4)) and causes the any one of the speed-change gears of the second speed-change gear group (40(48) and 42(50)) to return to the neutral position and subsequently interrupts energization to the third switching unit (70*p*8). Accordingly, it is possible to avoid occurrence of the inconvenience of being fixed to any one of the speed stages of the second gear engaging mechanism 60(2-4).

That is, if disconnection or a short circuit has occurred in the third switching unit (70*p*8) that switches the speed stages, the energization to the third switching unit (70*p*8) is interrupted by stopping the energization to a transistor inserted between the third switching unit and a power supply, and when the first switching unit (70*m*8) and the second switching unit (70*w*8) are also connected to the transistor, which is the identical power supply, and when the operations are stopped by the stop of the energization to the transistor and as a result, any one of the speed-change gears 40(48) and 42(50) of the second gear engaging mechanism 60(2-4) is shifted from a neutral position, that is, is put in gear or at an intermediate position, if the second clutch 26 on the side of the second gear engaging mechanism is engaged for some reason, inconvenience of immobility at the speed stage may be caused.

However, such an inconvenience may be avoided by switching the position of the second switching valve (70*w*) through the energization to the second switching unit, switching the supply of the hydraulic pressure of the hydraulic oil among the plurality of oil passages, causing the any one of the speed-change gears 40(48) and 42(50) of the second speed-change gear group, which has been shifted from the neutral position, to return to the neutral position, and subsequently interrupting the energization to the third switching unit (70*p*8).

In the description above, the twin-clutch transmission is not limited to the configurations illustrated in the drawings and may have any other configuration only if the configuration includes the above-described gear engaging mechanisms.

According to a first aspect of an embodiment of the present application, a control apparatus of an automatic transmission includes: a first input shaft and a second input shaft that input rotation of a prime motor installed in a vehicle via a first clutch and a second clutch; at least one output shaft arranged in parallel to the first input shaft and the second input shaft; a plurality of first speed-change gear groups that are arranged between the first input shaft and the output shaft, and when engaged with the first input shaft and the output shaft by a first gear engaging mechanism, are capable of changing speed of rotation of the first input shaft input via the first clutch and transferring the rotation to the output shaft; a plurality of second speed-change gear groups that are arranged between the second input shaft and the output shaft and when engaged with the second input shaft and the output shaft by a second gear engaging mechanism, are capable of changing speed of rotation of the second input shaft input via the second clutch and transferring the rotation to the output shaft; a first transfer route made up of the first clutch, the first input shaft, the first gear engaging mechanism, and the first speed-change gear group; a second transfer route made up of the second clutch, the second input shaft, the second gear engaging mechanism, and the second speed-change gear group; an oil pump connected to the prime motor; a first pressure regulating unit that is arranged in an oil passage connected to an outlet of the oil pump and is capable of regulating hydraulic pressure of a hydraulic oil discharged from the oil pump; a first switching valve that is arranged downstream of the first pressure regulating unit in the oil passage, is capable of switching supply of the hydraulic pressure of the hydraulic oil regulated by the first pressure regulating unit among a plurality of oil passages, when being at a position connected to one of the plurality of oil passages, supplies the hydraulic pressure of the hydraulic oil to the second clutch, when being at a position connected to another one of the plurality of oil passages, supplies the hydraulic pressure of the hydraulic oil to the second gear engaging mechanism in the second transfer route and causes any one of speed-change gears of the second speed-change gear group including a speed-change gear with a minimum transmission ratio to engage with the second input shaft and the output shaft; a first switching unit that when energized, switches the first switching valve from the position connected to the one of the plurality of oil passages to the position connected to the another one of the plurality of oil passages; an anomaly determination unit that determines whether high-pressure anomaly has occurred in the first pressure regulating unit, the high-pressure anomaly causing the first pressure regulating unit to perform regulation to high pressure only; and an energization interrupting unit that when the anomaly determination unit determines that the high-pressure anomaly has occurred in the first pressure regulating unit and when the first switching valve is at the position connected to the one of the plurality of oil passages and supplies the hydraulic pressure of the hydraulic oil to the second clutch, interrupts energization to the first switching unit.

Accordingly, if anomaly has occurred in the hydraulic pressure supply circuit, it is possible to ensure continuous travel of a vehicle while taking a possibility of the anomaly becoming failure into account.

That is, in a case where for example, first to eighth speed-change gears are provided, when the first pressure regulating unit is made up of a solenoid valve and it is determined that high-pressure anomaly, which causes the first pressure regulating unit to perform regulation to high pressure only, has occurred in the first pressure regulating unit, and when the first switching valve is connected to one of the oil passages and supplies the hydraulic pressure of the hydraulic oil to for example, the second clutch on the even-numbered stage side, and if the anomaly of the first pressure regulating unit becomes failure, change in position from the position connected to the one oil passage to the position connected to another oil passage is caused and any one of the speed-change gears of the second speed-change gear group including a speed-change gear with a minimum transmission ratio, which is for example, the eighth speed gear, is engaged and as a result, there arises a possibility that continuous travel of the vehicle will be difficult. However, when the energization to the first switching unit is interrupted in advance before the anomaly becomes failure, the engagement with the even-numbered stages, which include the second, fourth, sixth, and above-mentioned eighth speed gears, may be inhibited. Since in contrast, engagement with the first, third, fifth, and seventh speed gears of the odd-numbered stages is possible, travel of the vehicle may be ensured by selecting any one of the gears on the odd-numbered stage side.

The control apparatus of the automatic transmission according to a second aspect of the embodiment of the present application includes: a second pressure regulating unit that is arranged in the oil passage connected to the outlet of the oil pump and is capable of regulating the hydraulic pressure of the hydraulic oil discharged from the oil pump; a third switching valve that is arranged downstream of the second pressure regulating unit in the oil passage, is capable of switching supply of the hydraulic pressure of the hydraulic oil regulated by the second pressure regulating unit among the plurality of oil passages, when being at the position connected to the one of the plurality of oil passages, supplies the hydraulic pressure of the hydraulic oil to the second gear engaging mechanism in the second transfer route via the second switching valve and causes any one of the speed-change gears of the second speed-change gear group to engage with the second input shaft and the output shaft, when being at the position connected to the another one of the plurality of oil passages, supplies the hydraulic pressure of the hydraulic oil to the first gear engaging mechanism in the first transfer route via the second switching valve and causes any one of speed-change gears of the first speed-change gear group to engage with the first input shaft and the output shaft; a second switching unit that when energized, switches a position of the second switching valve; a third switching unit that when energized, switches the third switching valve from a position connected to the one of the plurality of oil passages to a position connected to the another one of the plurality of oil passages; an anomaly determination unit that determines whether anomaly of disconnection or a short circuit has occurred in the third switching unit when it is determined that the high-pressure anomaly has occurred in the first pressure regulating unit and the third switching valve is at the position connected to the another one of the plurality of oil passages and supplies the hydraulic pressure of the hydraulic oil to the first gear engaging mechanism in the first transfer route and cause any one of the speed-change gears of the first speed-change gear group to engage with the first input shaft and the output shaft; and a gear shift energization interrupting unit that when the anomaly determination unit determines that the anomaly has occurred in the third switching unit and determines that the third switching valve is connected to the one of the plurality of oil passages, supplies the hydraulic pressure of the hydraulic oil to the second gear engaging mechanism, and shifts any one of the speed-change gears of the second speed-change gear group from a neutral position, and when the first switching unit, the second switching unit, and the third switching unit are connected to an identical power supply, energizes the second switching unit and switches the position of the second switching valve, supplies the hydraulic pressure of the hydraulic oil to the second gear engaging mechanism and causes the any one of the speed-change gears of the second speed-change gear group to return to the neutral position and subsequently interrupts energization to the third switching unit.

Accordingly, it is possible to avoid occurrence of the inconvenience of being fixed to any one of the speed stages of the second gear engaging mechanism.

That is, if disconnection or a short circuit has occurred in the third switching unit that switches the speed stages, the energization to the third switching unit is interrupted by stopping the energization to a transistor inserted between the third switching unit and a power supply, and when the first switching unit and the second switching unit are also connected to the transistor, which is the identical power supply, and when the operations are stopped by the stop of the energization to the transistor and as a result, any one of the speed-change gears of the second gear engaging mechanism is shifted from a neutral position, that is, is put in gear or at an intermediate position, if the second clutch on the side of the second gear engaging mechanism is engaged for some reason, inconvenience of immobility at the speed stage may be caused.

However, such an inconvenience may be avoided by switching the position of the second switching valve through the energization to the second switching unit, switching the supply of the hydraulic pressure of the hydraulic oil among the plurality of oil passages, causing the any one of the speed-change gears of the second speed-change gear group, which has been shifted from the neutral position, to return to the neutral position, and subsequently interrupting the energization to the third driving unit.

Obviously, numerous modifications and variations of the present invention are possible in light of the above teachings. It is therefore to be understood that within the scope of the appended claims, the invention may be practiced otherwise than as specifically described herein.

What is claimed is:

1. A control apparatus of an automatic transmission comprising:
    a first input shaft and a second input shaft that input rotation of a prime motor installed in a vehicle via a first clutch and a second clutch;
    at least one output shaft arranged in parallel to the first input shaft and the second input shaft;
    a plurality of first speed-change gear groups that are arranged between the first input shaft and the output shaft, and when engaged with the first input shaft and the output shaft by a first gear engaging mechanism, are capable of changing speed of rotation of the first input shaft input via the first clutch and transferring the rotation to the output shaft;
    a plurality of second speed-change gear groups that are arranged between the second input shaft and the output shaft and when engaged with the second input shaft and the output shaft by a second gear engaging mechanism, are capable of changing speed of rotation of the second input shaft input via the second clutch and transferring the rotation to the output shaft;
    a first transfer route made up of the first clutch, the first input shaft, the first gear engaging mechanism, and the first speed-change gear group;
    a second transfer route made up of the second clutch, the second input shaft, the second gear engaging mechanism, and the second speed-change gear group;
    an oil pump connected to the prime motor;
    a first pressure regulating unit that is arranged in a supply oil passage connected to an outlet of the oil pump and is capable of regulating hydraulic pressure of a hydraulic oil discharged from the oil pump;
    a first switching valve that is arranged downstream of the first pressure regulating unit in the supply oil passage, is capable of switching supply of the hydraulic pressure of the hydraulic oil regulated by the first pressure regulating unit among a first plurality of oil passages, when being at a position connected to a first oil passage of the first plurality of oil passages, supplies the hydraulic pressure of the hydraulic oil to the second clutch, when being at a position connected to a second oil passage of the first plurality of oil passages, supplies the hydraulic pressure of the hydraulic oil to the second gear engaging mechanism in the second transfer route and causes any one of speed-change gears of the second speed-change gear group including a speed-change gear with a minimum transmission ratio to engage with the second input shaft and the output shaft;
    a first switching unit that when energized, switches the first switching valve from the position connected to the first oil passage to the position connected to the second oil passage;
    an anomaly determination unit that determines whether high-pressure anomaly has occurred in the first pressure regulating unit, the high-pressure anomaly causing the first pressure regulating unit to perform regulation to high pressure only; and
    an energization interrupting unit that when the anomaly determination unit determines that the high-pressure anomaly has occurred in the first pressure regulating unit and when the first switching valve is at the position connected to the first oil passage and supplies the hydraulic pressure of the hydraulic oil to the second clutch, interrupts energization to the first switching unit before failure of the first switching valve to prevent engagement of the speed-change gear with the minimum transmission ratio of the second gear engaging mechanism.

2. The control apparatus of the automatic transmission according to claim 1, the control apparatus further comprising:
    a second pressure regulating unit that is arranged in the supply oil passage connected to the outlet of the oil pump and is capable of regulating the hydraulic pressure of the hydraulic oil discharged from the oil pump;
    a second switching valve;
    a third switching valve that is arranged downstream of the second pressure regulating unit in the supply oil passage, is capable of switching supply of the hydraulic pressure of the hydraulic oil regulated by the second pressure regulating unit among a second plurality of oil passages, when being at the position connected to a third oil passage of the second plurality of oil passages, supplies the hydraulic pressure of the hydraulic oil to the second gear engaging mechanism in the second transfer route via the second switching valve and causes any one of the speed-change gears of the second speed-change gear group to engage with the second input shaft and the output shaft, when being at the position connected to a fourth oil passage of the second plurality of oil passages, supplies the hydraulic pressure of the hydraulic oil to the first gear engaging mechanism in the first transfer route via the second switching valve and causes any one of speed-change gears of the first speed-change gear group to engage with the first input shaft and the output shaft;
    a second switching unit that when energized, switches a position of the second switching valve; and
    a third switching unit that when energized, switches the third switching valve from a position connected to the third oil passage to a position connected to the fourth oil passage,
    wherein the anomaly determination unit determines whether anomaly of disconnection or a short circuit has occurred in the third switching unit when it is determined that the high-pressure anomaly has occurred in the first pressure regulating unit and the third switching valve is at the position connected to the fourth oil passage and supplies the hydraulic pressure of the hydraulic oil to the first gear engaging mechanism in the first transfer route and cause any one of the speed-change gears of the first speed-change gear group to engage with the first input shaft and the output shaft, and
    wherein the energization interrupting unit when the anomaly determination unit determines that the anomaly has occurred in the third switching unit and determines that the third switching valve is connected to the third oil passage, supplies the hydraulic pressure of the hydraulic oil to the second gear engaging mechanism, and shifts any one of the speed-change gears of the second speed-change gear group from a neutral position, and when the first switching unit, the second switching unit, and the third switching unit are connected to an identical power supply, energizes the second switching unit and switches the position of the second switching valve, supplies the hydraulic pressure of the hydraulic oil to the second gear engaging mechanism and causes the any one of the speed-change gears of the second speed-change gear group to return to the neutral position and subsequently interrupts energization to the third switching unit.

3. An automatic transmission of a vehicle, comprising:
first and second input shafts arranged in parallel to each other to transmit rotation of a prime motor installed in the vehicle via first and second clutches;
at least one output shaft arranged in parallel to the first and second input shafts;
a first speed-change gear group arranged between the first input shaft and the at least one output shaft, the first speed-change gear group being to change speed of first rotation of the first input shaft transmitted via the first clutch so as to transmit the first rotation to the at least one output shaft in a state where the first speed-change gear group is engaged with the first input shaft and the at least one output shaft using a first gear engaging mechanism;
a second speed-change gear group arranged between the second input shaft and the at least one output shaft, the second speed-change gear group being to change speed of second rotation of the second input shaft transmitted via the second clutch so as to transmit the second rotation to the at least one output shaft in a state where the second speed-change gear group is engaged with the second input shaft and the at least one output shaft using a second gear engaging mechanism;
a first transfer route including the first clutch, the first input shaft, the first gear engaging mechanism, and the first speed-change gear group;
a second transfer route including the second clutch, the second input shaft, the second gear engaging mechanism, and the second speed-change gear group;
an oil pump connected to the prime motor;
a first pressure regulating device arranged in a supply oil passage connected to an outlet of the oil pump and configured to regulate hydraulic pressure of a hydraulic oil discharged from the oil pump;
a first switching valve arranged downstream of the first pressure regulating device in the supply oil passage, the first switching valve being configured to supply the hydraulic pressure of the hydraulic oil regulated by the first pressure regulating device to the second clutch in a state where the first switching valve is located at a first position connected to a first oil passage of a first plurality of oil passages to supply the hydraulic pressure of the hydraulic oil regulated by the first pressure regulating device, the first switching valve being configured to supply the hydraulic pressure of the hydraulic oil regulated by the first pressure regulating device to the second gear engaging mechanism in the second transfer route so as to engage any one of speed-change gears of the second speed-change gear group including a speed-change gear having a minimum transmission ratio with the second input shaft and the at least one output shaft in a state where the first switching valve is located at a second position connected to a second oil passage of the first plurality of oil passages to supply the hydraulic pressure of the hydraulic oil regulated by the first pressure regulating device;

a first switching device configured to switch the first switching valve from the first position connected to the first oil passage to the second position connected to the second oil passage in a state where the first switching device is energized;
an anomaly determination device configured to determine whether high-pressure anomaly has occurred in the first pressure regulating device, the high-pressure anomaly being to cause the first pressure regulating device to perform regulation to high pressure only; and
an energization interrupting device configured to interrupt energization to the first switching device in a case where the anomaly determination device determines that the high-pressure anomaly has occurred in the first pressure regulating device and in a state where the first switching valve is located at the first position connected to the first oil passage so as to supply the hydraulic pressure of the hydraulic oil regulated by the first pressure regulating device to the second clutch, the energization interrupting device being configured to interrupt the energization to the first switching device before failure of the first switching valve to prevent engagement of the speed-change gear with the minimum transmission ratio of the second gear engaging mechanism.

4. The automatic transmission according to claim 3, further comprising:
a second pressure regulating device arranged in the supply oil passage connected to the outlet of the oil pump and configured to regulate the hydraulic pressure of the hydraulic oil discharged from the oil pump;
a third switching valve arranged downstream of the second pressure regulating device in the supply oil passage, the third switching valve being configured to supply the hydraulic pressure of the hydraulic oil regulated by the second pressure regulating device to the second gear engaging mechanism in the second transfer route via a second switching valve so as to engage any one of the speed-change gears of the second speed-change gear group with the second input shaft and the at least one output shaft in a state where the third switching valve is located at a third position connected to a third oil passage of a second plurality of oil passages to supply the hydraulic pressure of the hydraulic oil regulated by the second pressure regulating device, the third switching valve being configured to supply the hydraulic pressure of the hydraulic oil regulated by the second pressure regulating device to the first gear engaging mechanism in the first transfer route via the second switching valve so as to engage any one of speed-change gears of the first speed-change gear group with the first input shaft and the at least one output shaft in a state where the third switching valve is located at a fourth position connected to a fourth oil passage of the second plurality of oil passages to supply the hydraulic pressure of the hydraulic oil regulated by the second pressure regulating device;
a second switching device configured to switch a position of the second switching valve in a state where the second switching device is energized; and
a third switching device configured to switch the third switching valve from the third position connected to the third oil passage to the fourth position connected to the fourth oil passage in a state where the third switching device is energized, wherein the anomaly determination device is configured to determine whether anomaly of disconnection or a short circuit has occurred in the third switching device in a state where the high-pressure anomaly has occurred in the first pressure regulating device and the third switching valve is located at the fourth position connected to the fourth oil passage and supplies the hydraulic pressure of the hydraulic oil regulated by the second pressure regulating device to the first gear engaging mechanism in the first transfer route so as to engage any one of the speed-change gears of the first speed-change gear group with the first input shaft and the at least one output shaft, and wherein the energization interrupting device is configured to energize the second switching device so as to switch the position of the second switching valve, configured to supply the hydraulic pressure of the hydraulic oil regulated by the second pressure regulating device to the second gear engaging mechanism so as to control any one of the speed-change gears of the second speed-change gear group to return to a neutral position, and subsequently configured to interrupt energization to the third switching device in a case where the anomaly determination device determines that the anomaly has occurred in the third switching device and determines that the third switching valve is located at the third position connected to the third oil passage, supplies the hydraulic pressure of the hydraulic oil regulated by the second pressure regulating device to the second gear engaging mechanism, and shifts the any one of the speed-change gears of the second speed-change gear group from the neutral position and in a case where the first switching device, the second switching device, and the third switching device are connected to a power supply.

5. The automatic transmission according to claim 3, wherein the anomaly determination device determines the high-pressure anomaly has occurred in the first pressure regulating device in a state where there is a difference between a command pressure given to the first pressure regulating device and an actual pressure of the first pressure regulating device detected by a pressure sensor.

6. A control apparatus of an automatic transmission, comprising:

an anomaly determination device configured to determine whether high-pressure anomaly has occurred in a first pressure regulating device, the high-pressure anomaly being to cause the first pressure regulating device to perform regulation to high pressure only, the first pressure regulating device being arranged in a supply oil passage connected to an outlet of an oil pump and configured to regulate hydraulic pressure of a hydraulic oil discharged from the oil pump, the oil pump being connected to a prime motor; and an energization interrupting device configured to interrupt energization to a first switching device in a case where the anomaly determination device determines that the high-pressure anomaly has occurred in the first pressure regulating device and in a state where a first switching valve is located at a first position connected to a first oil passage of a plurality of oil passages so as to supply the hydraulic pressure of the hydraulic oil regulated by the first pressure regulating device to a clutch, the first switching valve being arranged downstream of the first pressure regulating device in the supply oil passage, the first switching valve being configured to supply the hydraulic pressure of the hydraulic oil regulated by the first pressure regulating device to the clutch in a state where the first switching valve is located at the first position connected to the first oil passage of the plurality of oil passages to supply the hydraulic pressure of the hydraulic oil regulated by the first pressure regulating device, the first switching valve being configured to supply the hydraulic pressure of the hydraulic oil regulated by the first pressure regulating device to a gear engaging mechanism in a transfer route so as to engage any one of speed-change gears of a speed-change gear group including a speed-change gear having a minimum transmission ratio with an input shaft and at least one output shaft in a state where the first switching valve is located at a second position connected to a second oil passage of the plurality of oil passages to supply the hydraulic pressure of the hydraulic oil regulated by the first pressure regulating device, the speed-change gear group being arranged between the input shaft and the at least one output shaft, the speed-change gear group being to change speed of second rotation of the input shaft transmitted via the clutch so as to transmit the second rotation to the at least one output shaft in a state where the speed-change gear group is engaged with the input shaft and the at least one output shaft using the gear engaging mechanism, the transfer route including the clutch, the input shaft, the gear engaging mechanism, and the speed-change gear group, the first switching device being configured to switch the first switching valve from the first position connected to the first oil passage to the second position connected to the second oil passage in a state where the first switching device is energized, the energization interrupting device being configured to interrupt the energization to the first switching device before failure of the first switching valve to prevent engagement of the speed-change gear with the minimum transmission ratio of the gear engaging mechanism.

7. The control apparatus according to claim 6, wherein the anomaly determination device configured to determine whether anomaly of disconnection or a short circuit has occurred in a third switching device in a state where the high-pressure anomaly has occurred in the first pressure regulating device and a third switching valve is located at a fourth position connected to a fourth oil passage and supplies the hydraulic pressure of the hydraulic oil regulated by a second pressure regulating device to an additional gear engaging mechanism in an additional transfer route so as to engage any one of speed-change gears of an additional speed-change gear group with an additional input shaft and the at least one output shaft, the additional speed-change gear group being arranged between the additional input shaft and the at least one output shaft, the additional speed-change gear group being to change speed of first rotation of the additional input shaft transmitted via an additional clutch so as to transmit the first rotation to the at least one output shaft in a state where the additional speed-change gear group is engaged with the additional input shaft and the at least one output shaft using the additional gear engaging mechanism, the input shaft and the additional input shaft being arranged in parallel to each other to transmit rotation of the prime motor installed in a vehicle via the clutch and the additional clutch, the at least one output shaft being arranged in parallel to the input shaft and the additional input shaft, the additional transfer route including the additional clutch, the additional input shaft, the additional gear engaging mechanism, and the additional speed-change gear group, the second pressure regulating device being arranged in the oil passage connected to the outlet of the oil pump and configured to regulate the hydraulic pressure of the hydraulic oil discharged from the oil pump, the third switching valve being arranged downstream of the second pressure regulating device in the oil passage, the third switching valve being configured to supply the hydraulic pressure of the hydraulic oil regulated by the second pressure regulating device to the gear engaging mechanism in the transfer route via a second switching valve so as to engage any one of the speed-change gears of the speed-change gear group with the input shaft and the at least one output shaft in a state where the third switching valve is located at a third position connected to a third oil passage to supply the hydraulic pressure of the hydraulic oil regulated by the second pressure regulating device among oil passages, the third switching valve being configured to supply the hydraulic pressure of the hydraulic oil regulated by the second pressure regulating device to the additional gear engaging mechanism in the additional transfer route via the second switching valve so as to engage any one of the speed-change gears of the additional speed-change gear group with the additional input shaft and the at least one output shaft in a state where the third switching valve is located at the fourth position connected to the fourth oil passage to supply the hydraulic pressure of the hydraulic oil regulated by the second pressure regulating device, the third switching device being configured to switch the third switching valve from the third position connected to the third oil passage to the fourth position connected to the fourth oil passage in a state where the third switching device is energized; and wherein the energization interrupting device configured to energize a second switching device so as to switch a position of the second switching valve, configured to supply the hydraulic pressure of the hydraulic oil regulated by the second pressure regulating device to the gear engaging mechanism so as to control any one of the speed-change gears of the speed-change gear group to return to a neutral position, and subsequently configured to interrupt energization to the third switching device in a case where the anomaly determination device determines that the anomaly has occurred in the third switching device and determines that the third switching valve is located at the third position connected to the third oil passage, supplies the hydraulic pressure of the hydraulic oil regulated by the second pressure regulating device to the gear engaging mechanism, and shifts the any one of the speed-change gears of the speed-change gear group from the neutral position and in a case where the first switching device, the second switching device, and the third switching device are connected to a power supply, the second switching device being configured to switch the position of the second switching valve in a state where the second switching device is energized.

* * * * *